(12) United States Patent
Watanabe et al.

(10) Patent No.: US 9,319,699 B2
(45) Date of Patent: Apr. 19, 2016

(54) APPARATUS, METHOD AND PROGRAM FOR IMAGE CONVERSION

(75) Inventors: Kazuteru Watanabe, Tokyo (JP); Kazunori Ozawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1090 days.

(21) Appl. No.: 13/143,141

(22) PCT Filed: Jan. 7, 2010

(86) PCT No.: PCT/JP2010/050083
§ 371 (c)(1),
(2), (4) Date: Jul. 1, 2011

(87) PCT Pub. No.: WO2010/079797
PCT Pub. Date: Jul. 15, 2010

(65) Prior Publication Data
US 2012/0014432 A1 Jan. 19, 2012

(30) Foreign Application Priority Data
Jan. 8, 2009 (JP) ................................. 2009-002989

(51) Int. Cl.
*H04N 7/26* (2006.01)
*H04N 19/196* (2014.01)
*H04N 19/51* (2014.01)
*H04N 19/40* (2014.01)
*H04N 19/59* (2014.01)

(52) U.S. Cl.
CPC ........... *H04N 19/196* (2014.11); *H04N 19/198* (2014.11); *H04N 19/40* (2014.11); *H04N 19/51* (2014.11); *H04N 19/59* (2014.11)

(58) Field of Classification Search
CPC .................................................. H04N 7/26941
USPC ...................................................... 375/240.02
See application file for complete search history.

(56) References Cited

U.S. PATENT DOCUMENTS

2005/0249277 A1\* 11/2005 Ratakonda et al. ...... 375/240.03
2006/0045363 A1\* 3/2006 Dei et al. ..................... 382/232
(Continued)

FOREIGN PATENT DOCUMENTS

| JP | 2001112002 A | 4/2001 |
| JP | 2002142222 A | 5/2002 |
| JP | 2002344973 A | 11/2002 |

(Continued)

OTHER PUBLICATIONS

International Search Report for PCT/JP2010/050083 mailed Apr. 13, 2010.
(Continued)

*Primary Examiner* — Christopher S Kelley
*Assistant Examiner* — Jonathan Messmore

(57) ABSTRACT

Disclosed is a conversion apparatus including a decoding unit that decodes input encoded data into image data, and a size conversion unit that converts size of the image data based on a size conversion request received from outside and that expands/contracts, or splits/synthesizes motion vector or prediction mode of encoding parameters, received from the decoding unit, based upon a size conversion request, and an encoding unit that encodes image data after size conversion using the prediction mode or motion vector converted and transmits the resulting encoded image data via a transmission buffer to outside.

17 Claims, 19 Drawing Sheets

(56) References Cited

U.S. PATENT DOCUMENTS

2009/0080524 A1* 3/2009 Fujisawa et al. ......... 375/240.15
2009/0168880 A1* 7/2009 Jeon et al. ................ 375/240.16

FOREIGN PATENT DOCUMENTS

| JP | 2002374536 A | 12/2002 |
| JP | 2005-160048 A | 6/2005 |
| JP | 2005252555 A | 9/2005 |
| JP | 2006186979 A | 7/2006 |
| JP | 2007-74215 A | 3/2007 |
| JP | 2009-206911 A | 9/2009 |

OTHER PUBLICATIONS

Japanese Office Action for JP Application No. 2013-106299 mailed on Feb. 25, 2014 with English Translation.

* cited by examiner

APPARATUS, METHOD AND PROGRAM FOR IMAGE CONVERSION

CROSS-REFERENCE TO RELATED APPLICATION

The present application is the National Phase of PCT/JP2010/050083, filed Jan. 7, 2010, which claims priority rights based upon JP Patent Application JP 2009-002989 filed on Jan. 8, 2009. The total contents of the JP Patent Application of the senior filing date are to be incorporated and disclosed by reference in the present specification.

TECHNICAL FIELD

This invention relates to a technique of picture conversion and, more particularly, to a method, an apparatus and a program that may be applied to advantage to re-encoding to be executed at the time of conversion in size of a bit stream obtained on encoding a moving picture for compression.

BACKGROUND

In these days, H.261 and H.263, recommended by ITU-T (International Telecommunication Union Telecommunication Standardization Sector), and MPEG-4 (Moving Picture Experts Group Phase 4), internationally standardized by ISO/IEC (International Organization for Standardization/International Electrotechnical Commission), have been known as moving picture compression encoding systems for efficiently transmitting a moving picture signal at a low bit rate. Also, H.264/MPEG-4 AVC (Advanced Video Coding), internationally standardized by the ITU-T and ISO/IEC, is attracting notice as being a system capable of transmitting a moving picture signal more efficiently than the above mentioned moving picture compression encoding systems.

The moving image compression encoding system uses intra-prediction that executes encoding using only image data of the current frame and inter-prediction that executes encoding using images of a past frame and/or a future frame.

With the intra-prediction, DCT (Discrete Cosine Transform) is applied in encoding to an input image frame, in terms of a macro-block as a unit, to generate DCT coefficients, which DCT coefficients are then encoded by variable length encoding. Or, prediction is carried out on a per macro-block basis or on a per block basis obtained on further subdividing the macro-block, using pixels of near-by blocks, such as left or upper blocks: DCT or DIT (Discrete Integer Transform) is then applied to a prediction residual signal to generate DCT or DIT coefficients, which are then encoded by variable length encoding.

With the inter-prediction, in encoding an input image frame, motion compensation prediction is executed with decoded pixels of past and/or future frames to find a prediction residual signal. DCT or DIT is then applied to the residual signal, after which the motion vector as well as DCT coefficients are encoded by variable length encoding.

In these days, such a system that interconnects terminals of different sorts, such as mobile phones or PCs, or terminals of the same sort but different in functions, is being discussed.

In such interconnection, there is a difference in capabilities of terminals, depending upon the sorts of the terminals, such as mobile phones or PCs, or upon functions of the terminals. Thus, data communication which is adapted to different terminals is required.

In data communication of moving images, image size that may be displayed may differ from one terminal to another because of difference in limitations imposed by respective terminals. It is thus necessary to provide a conversion apparatus that converts an encoded bit stream of a moving image (encoded data) to one which fits in with a terminal of interest.

However, to execute size conversion of received encoded data, it is necessary to decode the received encoded data, to convert the image size and finally to re-encode the moving image signal having image size changed.

Moreover, in case a network of destination of connection differs in bandwidth, in particular, is narrower in bandwidth, it is necessary to suppress the bit rate of the encoded data. However, if simply the bit rate is suppressed, the image quality is degraded. It is thus necessary to exercise caution to maintain the code amount per block in each frame such as by contracting the image size or by decreasing the frame rate.

In Patent Document 1 (JP Patent Kokai Publication No. JP-P2002-142222A), there is disclosed an image size changing device in which an image compression-encoded along a spatial axis and along a time axis may speedily be converted into image encoded with different resolution. A variable length decoding means decodes a compressed image to output an orthogonally-transformed image and motion vector information for each frame. The orthogonally-transformed image is then subjected to inverse quantization. A layered inverse orthogonal transform means executes inverse orthogonal transform to the orthogonally-transformed image in accordance with a change rate of the number of pixels to output a non-compressed difference image or a non-compressed changed in resolution. A motion vector correction means corrects the decoded motion vector information in accordance with a change rate of the number of pixels. A motion vector generation means generates motion vector information after the resolution change using the decoded motion vector information. A motion compensation non-compressed image generation means then uses the motion vector information after the resolution change to execute the processing of motion compensation of the non-compressed difference image to generate a non-compressed image. A motion compensation non-compressed difference image generation means uses the motion vector information after the resolution change to generate a non-compressed difference image or the non-compressed image. The non-compressed difference image or the non-compressed image is then compressed on encoding. The non-compressed image following the resolution change may directly be generated from the compressed image previous to the resolution change.

In Patent Document 2, there is disclosed an encoded data image size conversion apparatus whereby the image size of data encoded using prediction of motion compensation and orthogonal transform may readily be changed with improved image quality. With the encoded data image size conversion apparatus, macro-block image data, converted from input encoded image data to a preset image size, may be obtained by an image data conversion unit. A motion vector of the encoded image data supplied is multiplied by a motion vector conversion unit with a preset conversion ratio to obtain a converted motion vector for the macro-block image data. In case a conversion ratio is less than 1, an integrated motion vector is found depending upon the variance of a plurality of converted motion vectors necessary for conversion of the image data. Encoded data of a size-changed image is obtained using the integrated motion vector and the macro-block image data as found.

In Patent Document 3, there is disclosed a digital moving image decoding apparatus wherein an output image size may be changed by a simplified configuration. The digital moving image decoding apparatus is not susceptible to image quality degradation even in an image portion which moves intensely. Moreover, it is unnecessary to perform the processing of low pass filtering or decimation following the processing of decoding. The decoding apparatus includes a motion vector conversion unit that converts the value of the motion vector from the motion vector information included in a bit stream. In case the magnitude of the motion vector is small, inverse DCT is performed using only DCT coefficients of a lower frequency side and, in case the magnitude of the motion vector is large, inverse DCT is performed using not only DCT coefficients of the lower frequency side but also DCT coefficients of a high frequency side.

In Patent Document 4, there is disclosed an encoding apparatus that executes re-encoding in accordance with an encoding scheme which is a combination of motion compensation prediction and DCT. With the encoding apparatus, the calculations amount to be performed when encoded second video data with the changed image size is to be obtained from encoded first video data may be reduced on the whole. In decoding the encoded input data, necessary for re-encoding, the image size is converted in the DCT domain in connection with prediction error. It is then necessary to perform IDCT (Inverse DCT) processing followed by decoding into image data by motion compensation prediction in the spatial domain. The volume of calculations in IDCT processing and image size conversion may thus be decreased to prevent the volume of calculations in motion compensation prediction decoding in the DCT domain from increasing.

Patent Document 1: JP Patent Kokai Publication No. JP-P2002-142222A
Patent Document 2: JP Patent Kokai Publication No. JP-P2002-344973A
Patent Document 3: JP Patent Kokai Publication No. JP-P2001-112002A
Patent Document 4: JP Patent Kokai Publication JP-P2002-374536A

SUMMARY

The following is an analysis by the present invention.

In converting image size or frame rate, a most problem is a calculation amount for re-encoding. It is because calculation for re-prediction is necessary in encoding image data after image size conversion of a received stream.

On the other hand, in re-encoding after the image size conversion of a received stream, the usage of information of the received stream deteriorates the image quality.

It is an object of the present invention to provide an apparatus, a method and a program for speeding up conversion of image size of input encoded data.

It is another object of the present invention to provide an apparatus, a method and a program for suppressing image quality from being deteriorated in converting image size of input encoded data.

It is a further object of the present invention to provide an apparatus, a method and a program for speedily converting frame rate of input encoded data. It is yet another object of the present invention to provide an apparatus, a method and a program for suppressing deterioration in image quality when converting the frame rate of the input encoded data.

To accomplish at least one of the above mentioned objects, the invention disclosed in the present Application substantially has the following configuration, though not limited thereto.

In one aspect of the present invention, there is provided an image conversion apparatus including a decoding unit that decodes encoded data received, a size conversion unit that change the size of image data decoded, and an encoding unit that in encoding the image data after size change re-uses, for the encoding, at least one of prediction mode, block type, motion vector and the reference frame information of the encoded data received and a conversion control unit that receives size conversion request from outside said apparatus and encoding parameter supplied from said decoding unit to control said size conversion unit and said encoding unit.

In another aspect of the present invention, there is provided an image conversion method comprising:
decoding encoded data received,
changing the size of image data decoded,
re-using, in encoding the image data after size conversion, at least one of prediction mode, block type, motion vector and reference frame information of the encoded data received, for the encoding, and
controlling the size conversion and the encoding, based on size conversion request received from outside and encoding parameter from the decoding.

In yet another aspect, the present invention provides a program or a computer readable recording media storing therein a program causing a computer to execute the processing comprising:
decoding encoded data received, the processing of changing the size of image data decoded,
re-using, in encoding the image data after size conversion, at least one of prediction mode, block type, motion vector and reference frame information of the encoded data received, for the encoding, and
controlling the size conversion and the encoding, based on size conversion request received from outside and encoding parameter from the decoding.

According to the present invention, image size of input encoded data may be converted speedily. Moreover, according to the present invention, image quality may be prevented from being deteriorated in the conversion of the image size of the input encoded data.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Figure 1:
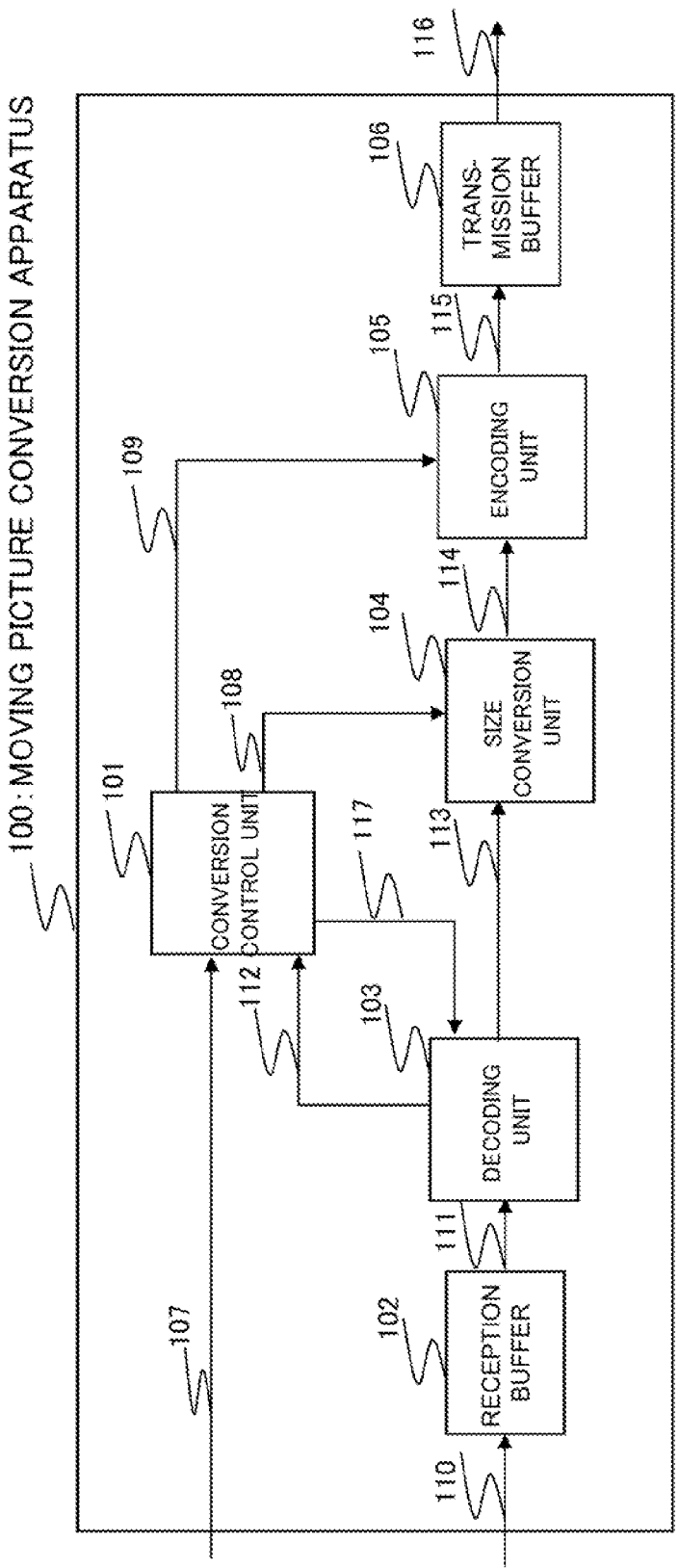
FIG. 1 is a diagram showing a configuration of a moving image conversion apparatus of Exemplary Embodiment 1 of the present invention.

According to the present invention, there are provided a means that decodes encoded data received, a means that changes the size of image data decoded, and a means that re-uses, in encoding the image data after size change, at least one of a prediction mode, a block type and a motion vector of the encoded data received, for the encoding.

More specifically, a moving image conversion apparatus (100 of FIG. 1) according to the present invention includes a reception buffer (102 of FIG. 1) that receives input encoded data (110 of FIG. 1), a decoding unit (103 of FIG. 1) that decodes the encoded data received from the reception buffer (102) into image data, a conversion control unit (101 of FIG. 1) that receives a size conversion request (107 of FIG. 1) from outside the apparatus and a set of encoding parameters (112 of FIG. 1) from the decoding unit (103 of FIG. 1) to control a size conversion unit (104 of FIG. 1) or an encoding unit (105 of FIG. 1), a size conversion unit (104) that converts the size of image data entered from the decoding unit (103) under a command from the conversion control unit (101), an encoding unit (105) that generates the encoded data from the image data supplied from the size conversion unit (104) under a command from the encoding unit (101), and a transmission buffer (106 of FIG. 1) that receives the encoded data from the encoding unit (105) to output the received encoded data.

The moving image conversion apparatus (100 of FIG. 1) according to the present invention, decodes the input encoded data in the decoding unit (103) into image data. Based upon the size conversion request received from outside, the size conversion unit (104) converts the size of the image. The moving image conversion apparatus then performs expansion/contraction and splitting/synthesis of motion vector or prediction mode, which is an encoding parameter obtained from the decoding unit (103), based upon the conversion ratio of the size conversion request. The encoding unit (105) encodes the image data after size conversion, using converted prediction mode or motion vector, and sends the encoded image data via the transmission buffer (106) to outside the moving image conversion apparatus. In the present invention, it is possible to provide a conversion system for speedily converting the image size of the input encoded data. Moreover, it is possible to provide a conversion system in which the image size of the input encoded data may be converted, using the input encoded data, in a manner substantially suppressing deterioration of image quality. The present invention will now be described with reference to Exemplary Embodiments.

Exemplary Embodiment 1

FIG. 1 shows a configuration of a moving image conversion apparatus 100 according to Exemplary Embodiment 1 of the present invention. Referring to FIG. 1, a moving image conversion apparatus 100 includes a conversion control unit 101, a reception buffer 102, a decoding unit 103, a size conversion unit 104, and encoding unit 105 and a transmission buffer 106.

Based upon a size conversion request 107 received from outside the apparatus and encoding parameters 112 from the decoding unit 103, the conversion control unit 101 sends a size conversion request 108 to the size conversion unit 104, and sends conversion information 109 to the encoding unit 105. The size conversion request 107 may include, for example, multiplication factor;
image size following size conversion;
bit rate; and
encoding information.

The conversion control unit 101, on receipt of encoding information from outside as the size conversion request 107, is able to send it to the decoding unit 103.

The following describes specifically the size conversion request 108 which is a command transmitted from the conversion control unit 101 to the size conversion unit 104.

On receipt of the size conversion request 107 from outside, the conversion control unit 101 sends the size conversion request 108 for converting the input image data size to the size conversion unit 104.

In case the size conversion request 107 from outside includes a multiplication factor, the size conversion request is transmitted unchanged to the size conversion unit 104.

In case the image size after conversion is supplied from outside, the conversion control unit 101 gets an image size before size conversion from the encoding parameters 112 received from the decoding unit 103 and sends the information on the multiplication factor or on the input/output image size to the size conversion unit 104. In case the image size after size conversion is the same as the image size before conversion, the conversion control unit 101 commands the size conversion unit 104 not to convert the image size.

The following describes specifically the conversion information 109 which is a command from the conversion control unit 101 to the encoding unit 105.

Using the size conversion request 107 from outside, and the set of encoding parameters 112, supplied from the decoding unit 103, the conversion control unit 101 generates the conversion information 109 to be sent to the encoding unit 105.

The conversion information 109 may include, for example,
  image data size;
  frame type;
  prediction mode and direction of prediction (direction of prediction)
  motion vector;
  reference frame information;
  block size;
  block type; and
  bit rate.

For inter-frame prediction, the following information in the conversion information 109 are used.
  frame type;
  motion vector;
  reference frame information;
  block size; and
  block type.

For intra-frame prediction, the following information in the conversion information 109, are used.
  frame type;
  prediction mode and direction of prediction;
  block size; and
  block type.

The following describes the sequence of operations for generating the conversion information 109 using the size conversion request 107 and encoding parameters 112.

For simplicity of explanation, the cases of the multiplication factor of 2 and ½ are taken by way of examples. Of course, these cases are for the sake of explanation only and are not for limiting the invention. As will be apparent from the principle of the present invention, using other multiplication factors, motion vector, prediction mode/direction or block size, may similarly be possible.

<Case 1> the Case of Doubling the Image Size (×2)

In case a motion vector of an 8×8 block A of input encoded data is five rightwards and four upwards, the information that the block is sized 16×16 and a motion vector is five rightwards and four upwards is sent to the encoding unit 105, in order to encode the block A after size conversion. The reference frame information has the same value as that of the input encoded data.

<Case 2> the Case of Halving the Image Size (×½)

In case the intra-frame prediction mode in an 8×8 block B of input encoded data is for leftward direction, the information that the block is sized 4×4 and that the intra-frame prediction mode is leftward direction is sent to the encoding unit 105, in order to encode the block B after size conversion.

The reception buffer 102 receives input encoded data 110, sent thereto from outside, and sends the received data to the decoding unit 103.

In case the encoding information 117 is notified from the conversion control unit 101, the decoding unit 103 decodes input image data 111 received from the reception buffer 102 to generate decoded image data 113 using the encoding information 117. The so decoded image data is sent to the size conversion unit 104.

In case the encoding information is not notified from the conversion control unit 101, the decoding unit 103 decodes the input encoded data, using the encoding information included in the input encoded data 111, to generate decoded image data.

The decoding unit 103 also notifies the conversion control unit 101 of encoding parameters 112 of the input encoded data obtained on decoding.

Using the multiplication factor or the input/output image size, included in the information of the size conversion request 108 from the conversion control unit 101, the size conversion unit 104 converts the image size of the image data 113 received from the decoding unit 103 and sends the so converted image data to the encoding unit 105.

Using the information from the conversion control unit 101, the encoding unit 105 encodes the image data received from the size conversion unit 104, and sends the so encoded data 115 to the transmission buffer 106.

In the present Exemplary Embodiment, the processing by the conversion control unit 101, the decoding unit 103, the size conversion unit 104 and the encoding unit 105 may be implemented by a program which is executed on a computer constituting the moving image conversion apparatus 100.

Figure 2:
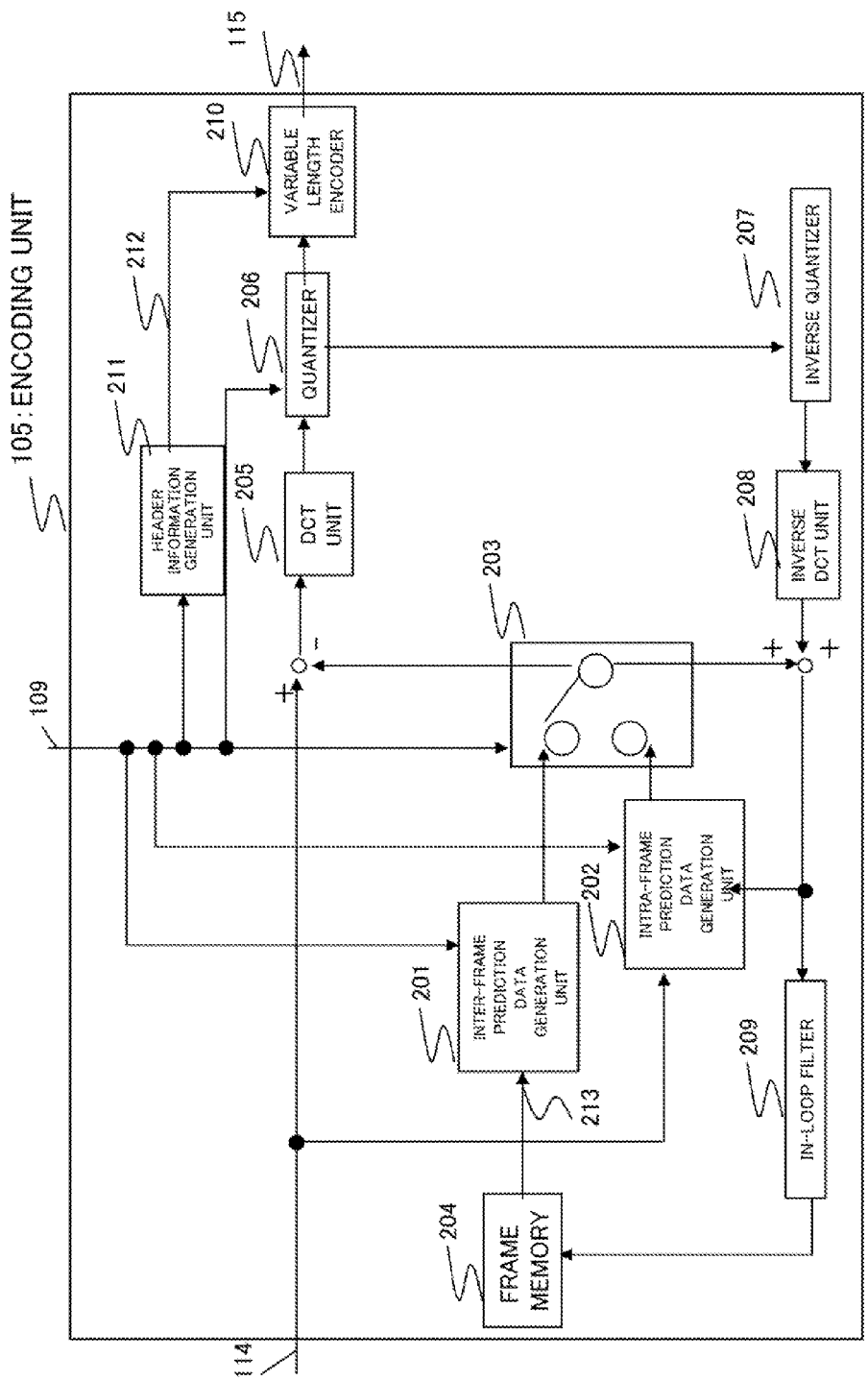
FIG. 2 is a diagram showing a configuration of an encoding unit of Exemplary Embodiments 1 to 4 of the present invention.

FIG. 2 shows the configuration of the encoding unit 105 of FIG. 1. Referring to FIG. 2, the encoding unit 105 will be described. Although the case of using H.264, is taken up for explanation in the present Exemplary Embodiment, it should be noted that this is merely an example presented for illustration of the present invention and not for limiting the invention. As will be apparent from the principle of the moving image conversion system, the present invention may operate with any other suitable moving image compression encoding systems.

Referring to FIG. 2, the encoding unit 105 includes an inter-frame prediction data generation unit 201, an intra-frame prediction data generation unit 202, a switch 203, a frame memory 204, a DCT unit 205, a quantizer 206, an inverse quantizer 207, an inverse DCT unit 208 and an in-loop filter 209. The encoding unit 105 also includes a variable length encoding unit 210 and a header information generator 211.

Using conversion information 109, received from the conversion control unit 101, and image data 213 from the frame memory 204, the inter-frame prediction data generation unit 201 performs inter-frame prediction, and generates prediction data which is sent to the switch 203. The conversion information 109 used in the inter-frame prediction data generation unit 201 may include:
  motion vector;
  reference frame information;
  block size; and
  block type.

Using the conversion information 109, received from the conversion control unit 101, and the image data 114, received from the size conversion unit 104, the intra-frame prediction data generation unit 202 performs intra-frame prediction to generate prediction data which is sent to the switch 203. The conversion information 109, used in the intra-frame prediction data generation unit 202, may include:
  prediction mode and direction of prediction;
  block size; and
  block type.

The switch 203 changes over prediction data, generated by the inter-frame prediction data generation unit 201 or the intra-frame prediction data generation unit 202, in accordance with the conversion information 109 as instructed by the conversion control unit 101 in such a manner that the prediction data will be able to be sent to the DCT unit 205, in-loop filter 209 and the intra-frame prediction data generation unit 202.

The quantizer 206 determines a quantization step, using the bit rate included in the conversion information 109 from the conversion control unit 101 as a goal. The method of deciding on the quantization step is similar to that for a normal encoding unit and hence is not explained.

Based upon the conversion information 109, received from the conversion control unit 101, the header information generator 211 generates the header information 212, which is output to the variable length encoding unit 210.

The conversion information 109 used by the header information generator 211 may include:
frame type;
image size;
motion vector;
block size;
block type;
prediction mode and direction of prediction; and
reference frame information.

Except for those described above, the configuration and the operation of FIG. 2 are similar to those of the routine encoding unit and hence the corresponding explanation is dispensed with.

Referring to FIG. 1, the transmission buffer 106 outputs an image stream received from the encoding unit 105 to outside.

In the present Exemplary Embodiment, the image size of input encoded data may be speedily converted.

Exemplary Embodiment 2

Figure 3:
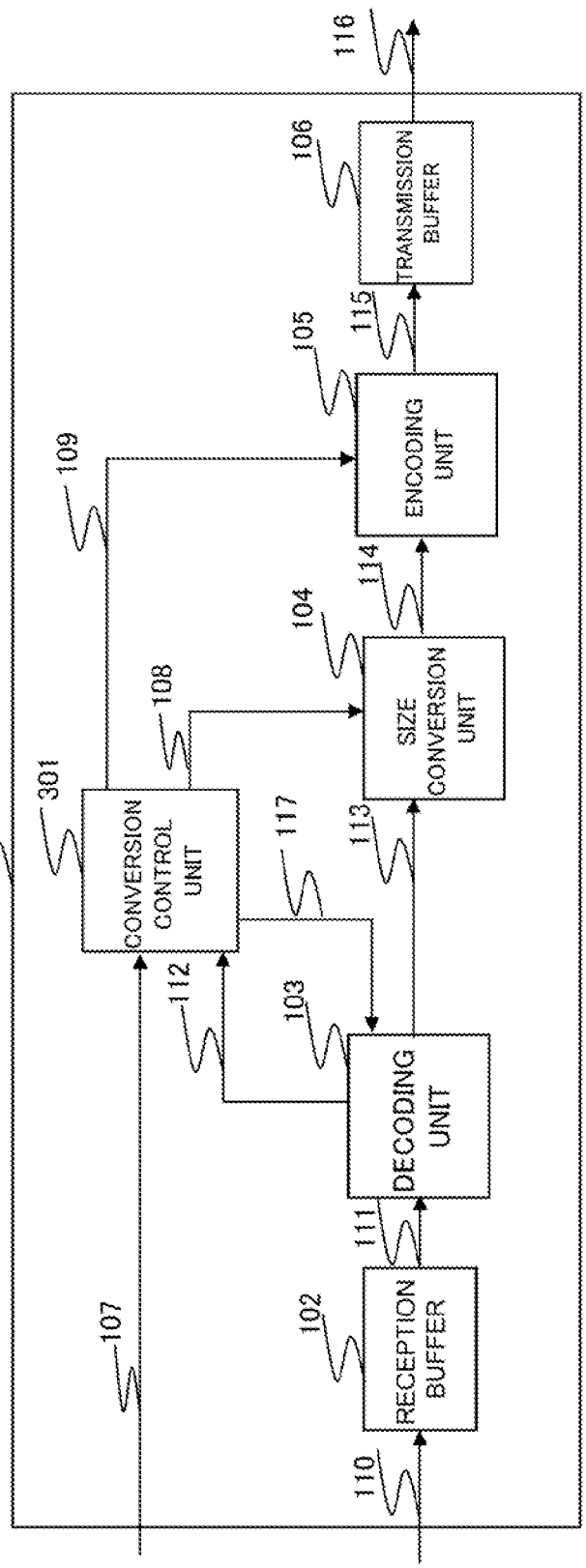
FIG. 3 is a diagram showing a configuration of a moving image conversion apparatus of Exemplary Embodiment 2 of the present invention.

The following describes Exemplary Embodiment 2 of the present invention. FIG. 3 shows a detailed configuration of a moving image conversion apparatus 300 of Exemplary Embodiment 2 of the present invention. In FIG. 3, the elements which are the same as those of FIG. 1 are depicted by the same reference numerals. In the following, the description of the elements which are the same as those of Exemplary Embodiment 1 is not made to avoid redundancy. Also, an encoding unit 105 is the same in configuration as that of FIG. 1.

A conversion control unit 301 sends a size conversion request 108 to a size conversion unit 104, and sends conversion information 109 to an encoding unit 105, based upon a size conversion request 107 from outside and upon encoding parameters 112 from a decoding unit 103.

The sequence of operations of preparing the conversion information 109 using the size conversion request 107 and the encoding parameters 112 will now be described. Although the multiplication factor is set to two for simplicity, by way of an example, any suitable multiplication factor other than two may be used.

<Case 1> Case of Doubling the Image Size (×2)

In case a motion vector of an 8×8 block A of input encoded image data is five rightwards and four upwards, and the block A after size conversion is to be encoded, a block sized 16×16 and a motion vector 10 rightwards and 8 upwards are sent to the encoding unit 105. The same values are used for the reference frame information as those of the input encoded data.

Except for those described above, the configuration and the operation are the same as those of Exemplary Embodiment 1, and hence the corresponding explanation is dispensed with. In the present Exemplary Embodiment, the image size of the input encoded data may be converted speedily. As compared to the above mentioned Exemplary Embodiment 1, the encoding efficiency may be improved in the present Exemplary Embodiment. The processing of the conversion control unit 301, decoding unit 103, size conversion unit 104 and the encoding unit 105 may be implemented in the present Exemplary Embodiment on a program which is executed on a computer of the moving image conversion apparatus 300.

Exemplary Embodiment 3

Figure 4:
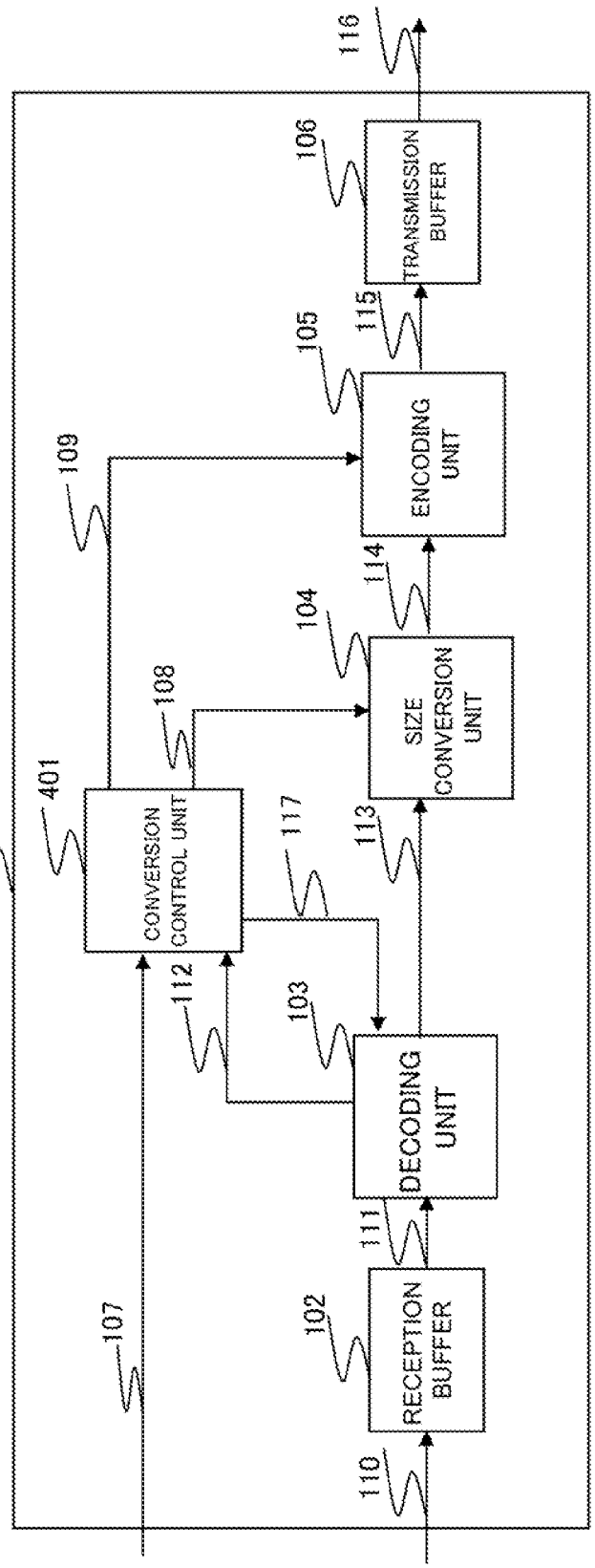
FIG. 4 is a diagram showing a configuration of a moving image conversion apparatus of Exemplary Embodiment 3 of the present invention.

The following describes Exemplary Embodiment 3 of the present invention. FIG. 4 shows a detailed configuration of a moving image conversion apparatus 400 of Exemplary Embodiment 3 of the present invention. In FIG. 4, the elements which are the same as those of FIG. 1 are depicted by the same reference numerals. In the following, the description of the elements which are the same as those of Exemplary Embodiment 1 is not made to avoid redundancy. Also, an encoding unit 105 is the same in configuration as that of FIG. 2.

A conversion control unit 401 sends a size conversion request 108 to a size conversion unit 104, and sends conversion information 109 to the encoding unit 105, based upon a size conversion request 107 from outside and encoding parameters 112 from a decoding unit 103.

The sequence of operations of preparing the conversion information 109 using the size conversion request 107 and the encoding parameters 112 will now be described. Although the multiplication factor is set to two for simplicity, by way of an example, it is possible to use any multiplication factor other than four.

<Case 1> Case of Quadrupling the Image Size (×4)

In case the intra-frame prediction mode of a 4×4 block B of input encoded image data is in the left upward direction, with an angle being 30°, the block size is set to 16×16 in order to encode the size-converted block B. If the left upward direction, with the angle of 30°, is not provided in the intra-frame prediction mode of the 16×16 block, approximation is made to an existing prediction direction. For example, if there are only four directions of leftward, rightward, upward and downward, the information for the leftward direction is sent to the encoding unit 105.

The configuration as well as the operation other than those described above is the same as those of the above described Exemplary Embodiment 1, and hence the corresponding explanation is dispensed with. In the present Exemplary Embodiment, the operation and the meritorious result may be displayed that the image size of the input encoded data may expeditiously be converted, while size conversion may be improved in flexibility. In the present Exemplary Embodiment, the processing by the conversion control unit 401, decoding unit 103, size conversion unit 104 and the encoding unit 105 may be implemented by a program which is executed on a computer of the moving image conversion apparatus 400.

Exemplary Embodiment 4

Figure 5:
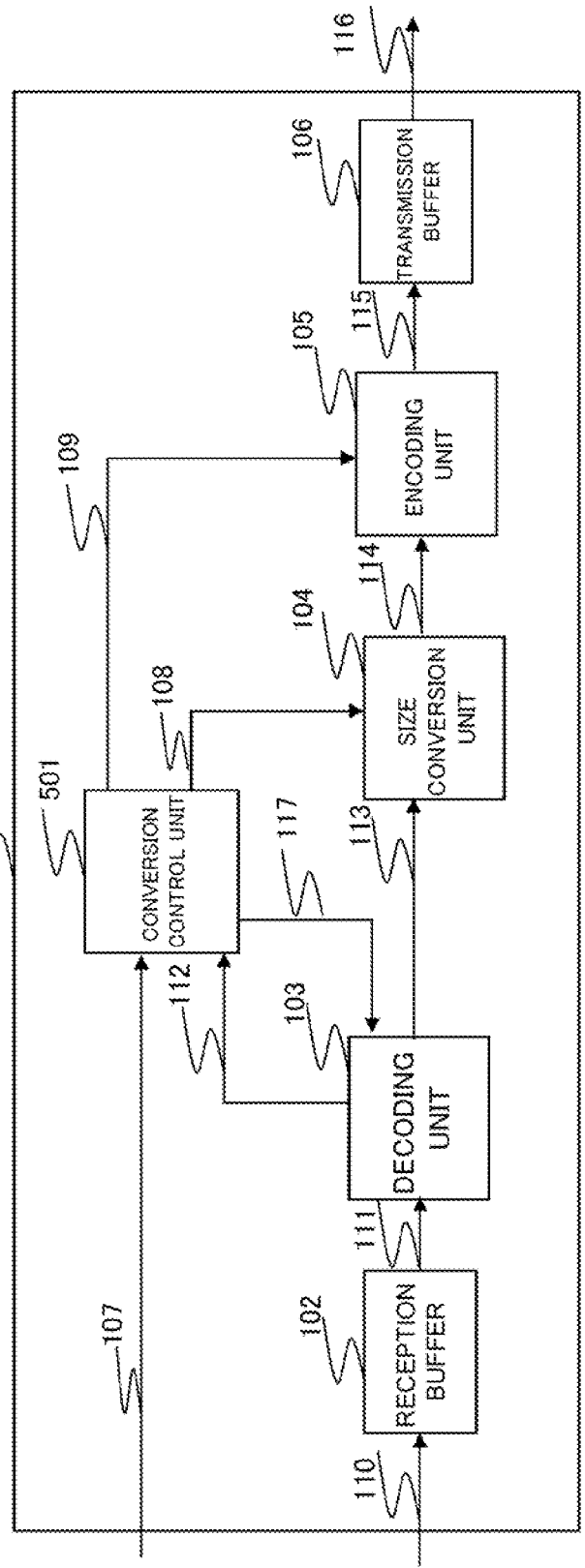
FIG. 5 is a diagram showing a configuration of a moving image conversion apparatus of Exemplary Embodiment 4 of the present invention.

The following describes Exemplary Embodiment 4 of the present invention. FIG. 5 shows a detailed configuration of a moving image conversion apparatus 500 of Exemplary Embodiment 4 of the present invention. In FIG. 5, the elements which are the same as those of FIG. 1 are depicted by the same reference numerals. In the following, the description of the same elements as those of Exemplary Embodiment 1 is dispensed with in order to avoid redundancy. Also, an encoding unit 105 is the same in configuration as that of FIG. 2.

A conversion control unit 501 sends a size conversion request 108 to a size conversion unit 104, and sends conversion information 109 to the encoding unit 105, based upon a size conversion request 107 from outside and encoding parameters 112 from a decoding unit 103.

The sequence of operations of preparing the conversion information 109 using a size conversion request 107 and the encoding parameters 112 will now be described. It is noted that the multiplication factor is set to two (×2) and one-half (×½) only by way of illustration. As will be apparent from the principle of the present invention, the cases of using other values of the multiplication factor or changing the motion vector, prediction mode/direction of prediction or the block size may similarly be dealt with by the present invention.

<Case 1> the Case of Doubling the Image Size (×2)

In case a motion vector of a 16×16 block A of the input encoded data is 5 rightwards and 4 upwards, the size of the block A is 32×32 after size conversion. In case the maximum unit size of the block for encoding is 16×16, it is necessary for encoding that the block A sized 32×32 following size conversion is divided into four parts. In this case, a motion vector of 10 rightwards and 8 upwards is sent to each of the four 16×16 blocks resulting from the division. The same data values as those of the input encoded data, are used at this time for the reference frame information.

<Case 2> the Case of Halving the Image Size (×½)

In case the intra-frame prediction mode of a 4×4 block B of the input encoded data is four leftwards, the block B after size conversion is 2×2. In case the minimum unit size of the block for encoding at this time is 4×4, it is necessary for encoding that the 2×2 block after size conversion is synthesized with neighboring 2×2 blocks to form a 4×4 block. At this time, the prediction modes and the directions of prediction of the 2×2 blocks are combined together to decide on a single prediction mode.

Regarding combining method, such prediction mode and such direction of prediction that are dominant in the four blocks are sent to the encoding unit 105. If, among the four 2×2 blocks, two are for leftwards and the remaining two are for upwards, with there being the mode of the 45° direction, a mode of 45° up leftward direction is selected. In case the four 2×2 blocks are for leftward, rightward, upward and downward, an average value mode is used.

Except for those described above, the configuration and the operation are the same as those of the Exemplary Embodiments 1 to 3, and hence the description is dispensed with. The present Exemplary Embodiment has an advantage that the image size of the input encoded data may be converted expeditiously, and that size conversion may be more flexible than in Exemplary Embodiment 3. In the present Exemplary Embodiment, the processing by the conversion control unit 501, decoding unit 103, size conversion unit 104 and the encoding unit 105 may be implemented on a program which is executed on a computer of the moving image conversion apparatus 500.

Exemplary Embodiment 5

Figure 6:
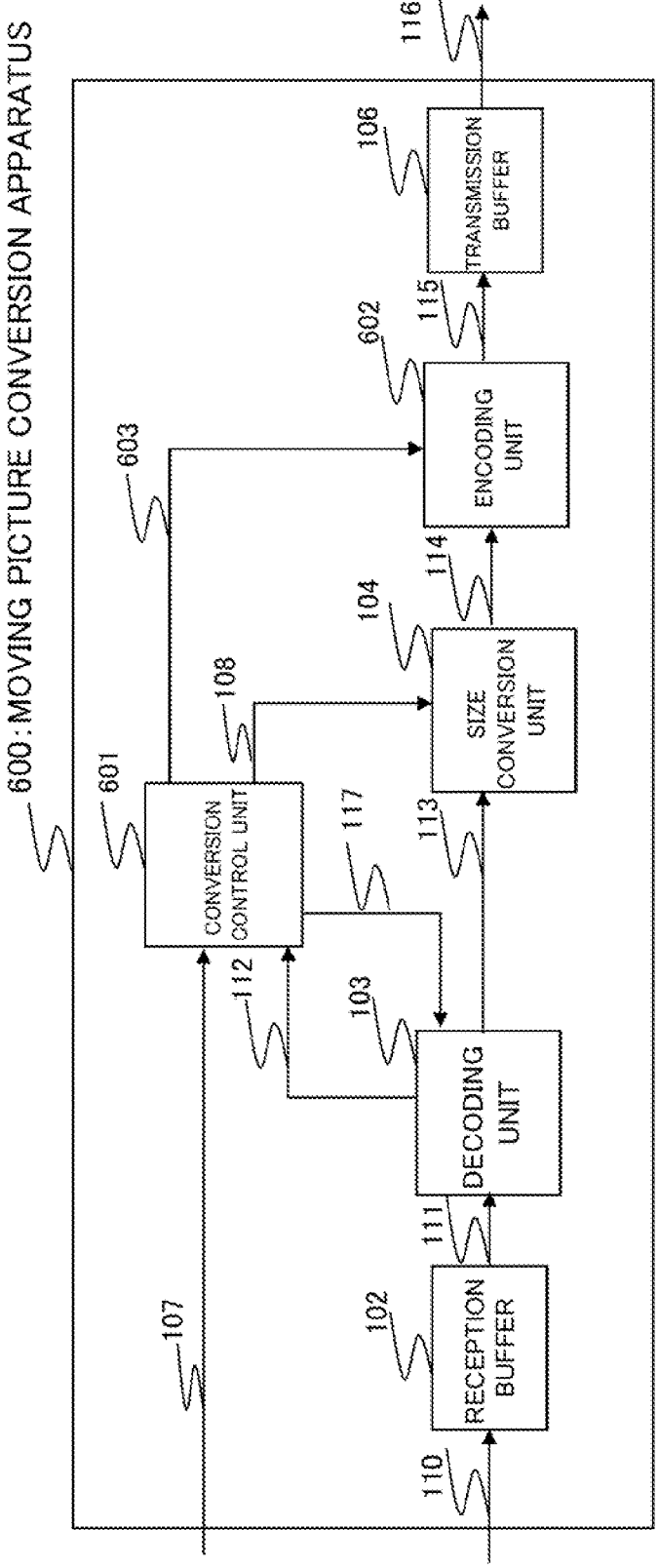
FIG. 6 is a diagram showing a configuration of a moving image conversion apparatus of Exemplary Embodiment 5 of the present invention.

The following describes Exemplary Embodiment 5 of the present invention. FIG. 6 shows the configuration of a moving image conversion apparatus 600 of Exemplary Embodiment 5 of the present invention. In FIG. 6, the elements that are the same as those of FIG. 1 are depicted by the same reference numerals. In the following, the explanation of the same elements is fittingly dispensed with to avoid redundancy.

Based upon a size conversion request 107 from outside and encoding parameters 112 from a decoding unit 103, a conversion control unit 601 sends a size conversion request 108 to a size conversion unit 104, and sends conversion information 603 to an encoding unit 602. As the conversion information 603, the following are sent.

an image data size;
frame type;
prediction mode and direction of prediction;
motion vector;
reference frame information;
block size;
block type; and
bit rate.

Figure 7:
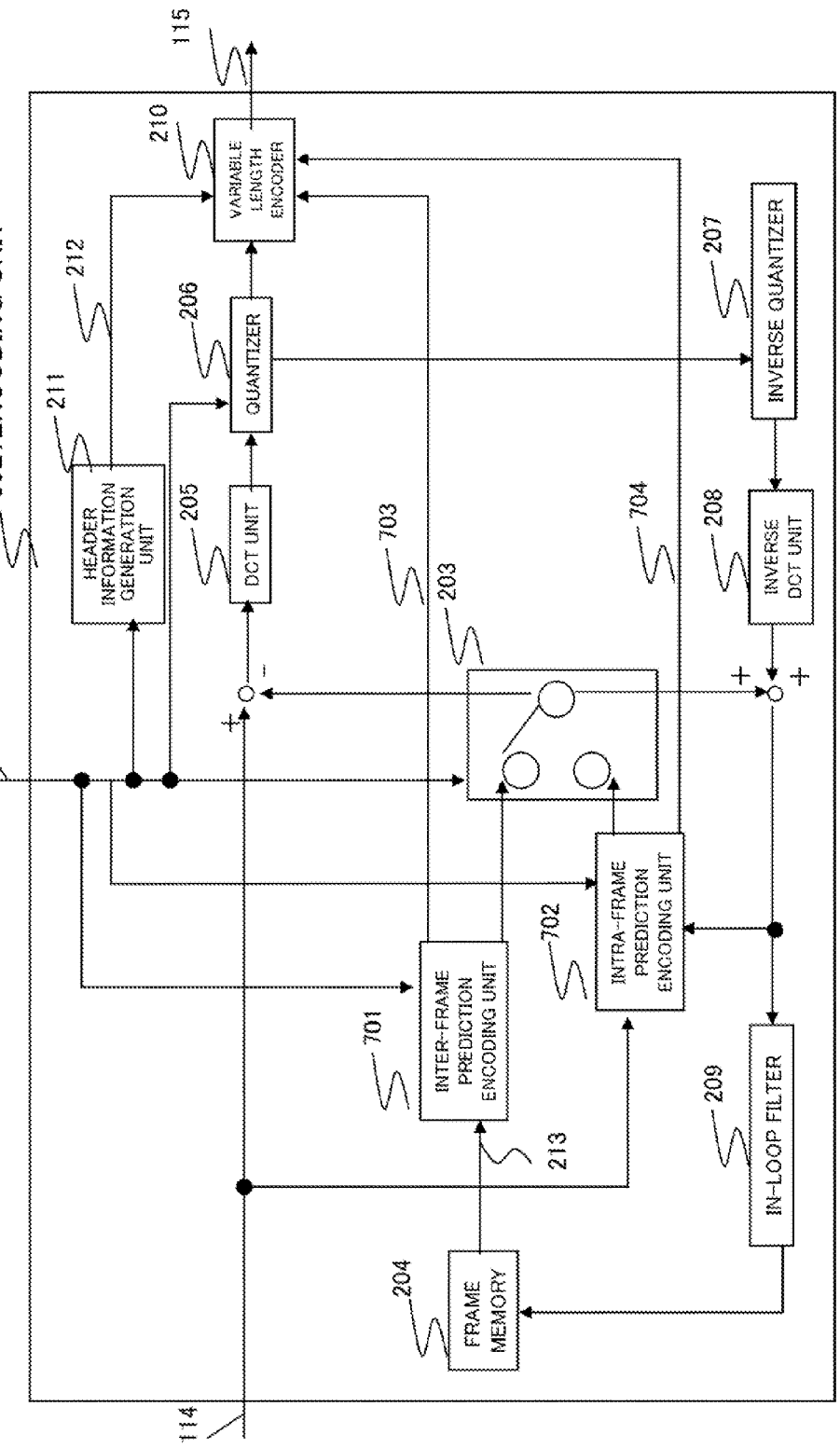
FIG. 7 is a diagram showing a configuration of an encoding unit of Exemplary Embodiment 5 of the present invention.

FIG. 7 shows a detailed configuration of an encoding unit 602 shown in FIG. 6. In FIG. 7, the elements that are the same as those of FIG. 2 are depicted by the same reference numerals. In the following, the explanation of the same elements is fittingly dispensed with to avoid redundancy.

Referring to FIG. 7, an inter-frame prediction encoding unit 701 executes inter-frame prediction encoding using conversion information 603 received from a conversion control unit 601. More specifically, the inter-frame prediction encoding unit 701 receives the reference frame information, a motion vector, a search range for the frame and a search range for the motion vector, as the conversion information 603.

On receipt of image data for one screen image from a frame memory 204, the inter-frame prediction encoding unit 701 executes inter-frame prediction for the image data of one screen image, just for the search range for the motion vector, with the motion vector as start point or as reference. The search range may be a range extending to a set of points evenly spaced apart a preset distance left wards, rightwards, upwards and downwards from the motion vector as start point. Or, the inter-frame prediction encoding unit 701 executes search such as to take advantage of the motion vector direction. That is, the search is made to a point spaced apart a preset distance from the above mentioned motion vector as start point, just in the direction of the motion vector.

In case the frame search range is two or more frames, the inter-frame prediction encoding unit 701 executes motion vector search for a frame search range, with a frame number as start point, in order to decide on best motion vector and frame number 703. The motion vector and frame number, thus decided on, are sent to a variable length encoder 210.

An intra-frame prediction encoding unit 702 executes intra-frame prediction/encoding, using the conversion information 603 received from the conversion control unit 601. More specifically, a prediction mode and a search range are received as the conversion information 603.

On receipt of a block for prediction and neighboring image data, the intra-frame prediction encoding unit 702 determines an optimum one 704, out of prediction modes in the search range, based on the received prediction mode as start point. The prediction mode 704, thus decided on, is sent to the variable length encoder 210.

An example method for searching with the prediction mode received by the conversion information 603 as start point will now be described.

In case there are directions for prediction every 45°, and the prediction mode, received from the information 603, is for the leftward direction, with the search range being two, not only the intra-frame prediction in the leftward direction but the intra-frame prediction of 45° up leftward as well as that of 45° down leftward is carried out to decide on an optimum prediction mode.

Except for those described above, the configuration and the operation are the same as those of the Exemplary Embodiments 1 to 4, and hence the corresponding explanation is dispensed with. In the present Exemplary Embodiment, the image size of the input encoded data may speedily be converted to advantage in such a manner as to enhance the image quality in comparison with the Exemplary Embodiments 1 to 4. In the present Exemplary Embodiment, the processing carried out by the conversion control unit 601, decoding unit 103, size conversion unit 104 and the encoding unit 602 may be implemented by a program which is executed on a computer of the moving image conversion apparatus 600.

Exemplary Embodiment 6

Figure 8:
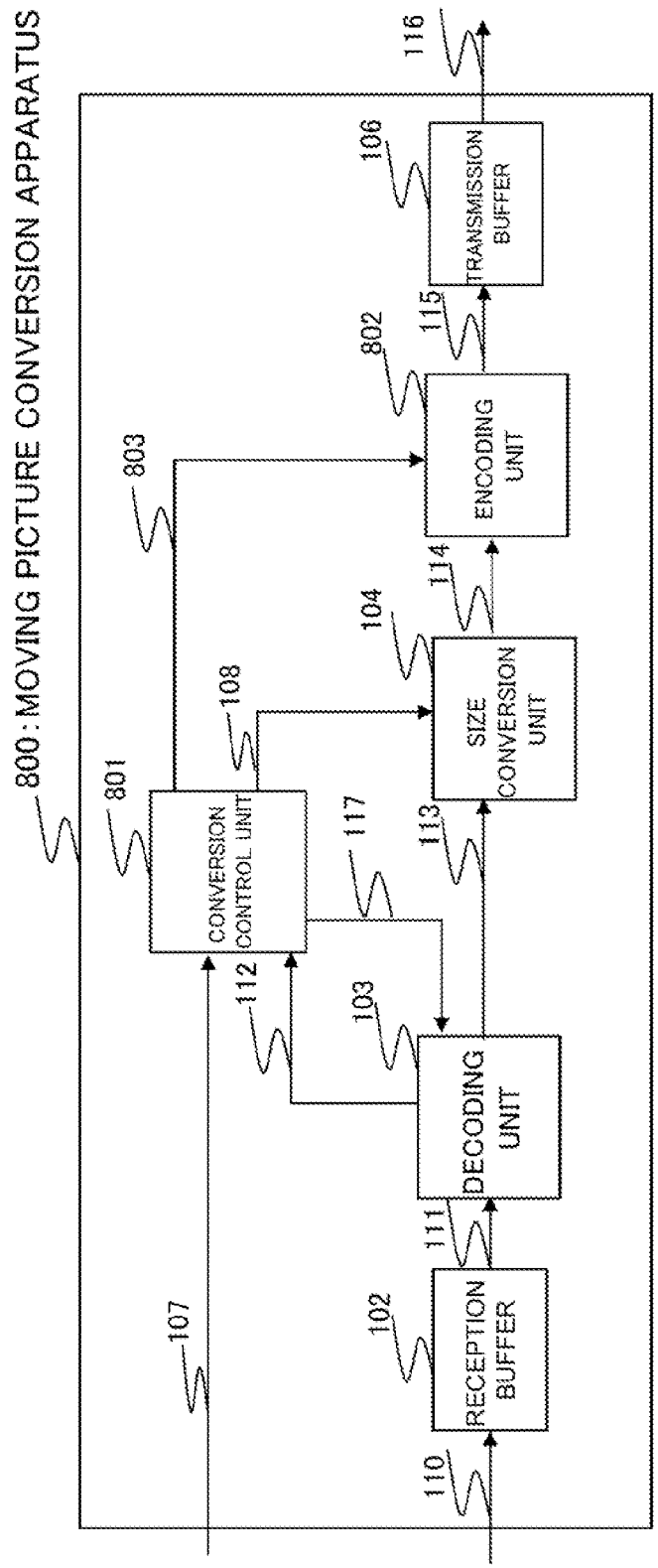
FIG. 8 is a diagram showing a configuration of a moving image conversion apparatus of Exemplary Embodiment 6 of the present invention.

The following describes Exemplary Embodiment 6 of the present invention. FIG. 8 shows a detailed configuration of a moving image conversion apparatus 800 in the Exemplary Embodiment 6. In FIG. 8, the elements which are the same as those of FIG. 1 are depicted by the same reference numerals. In the following, the explanation of the same elements is not made in order to avoid redundancy.

Based upon a size conversion request 107 from outside and upon encoding parameters 112 from a decoding unit 103, a conversion control unit 801 sends a size conversion request 108 to a size conversion unit 104, and sends conversion information 803 to an encoding unit 802.

The conversion control unit 801 sends as the conversion information 803, information including:
  image data size;
  frame type;
  prediction mode and direction of prediction;
  motion vector;
  reference frame information;
  block size;
  block type;
  code amount distribution bit rate of input encoded data; and
  threshold value to decide on whether or not to use a prediction mode or a motion vector.

The threshold value may be exemplified by
  (size of a block under prediction)×(mean value the amplitude of image data or square value of the mean value of the amplitude of image data), or
  a target code amount in each block calculated from bit rate or code amount distribution of the input encoded data.

Figure 9:
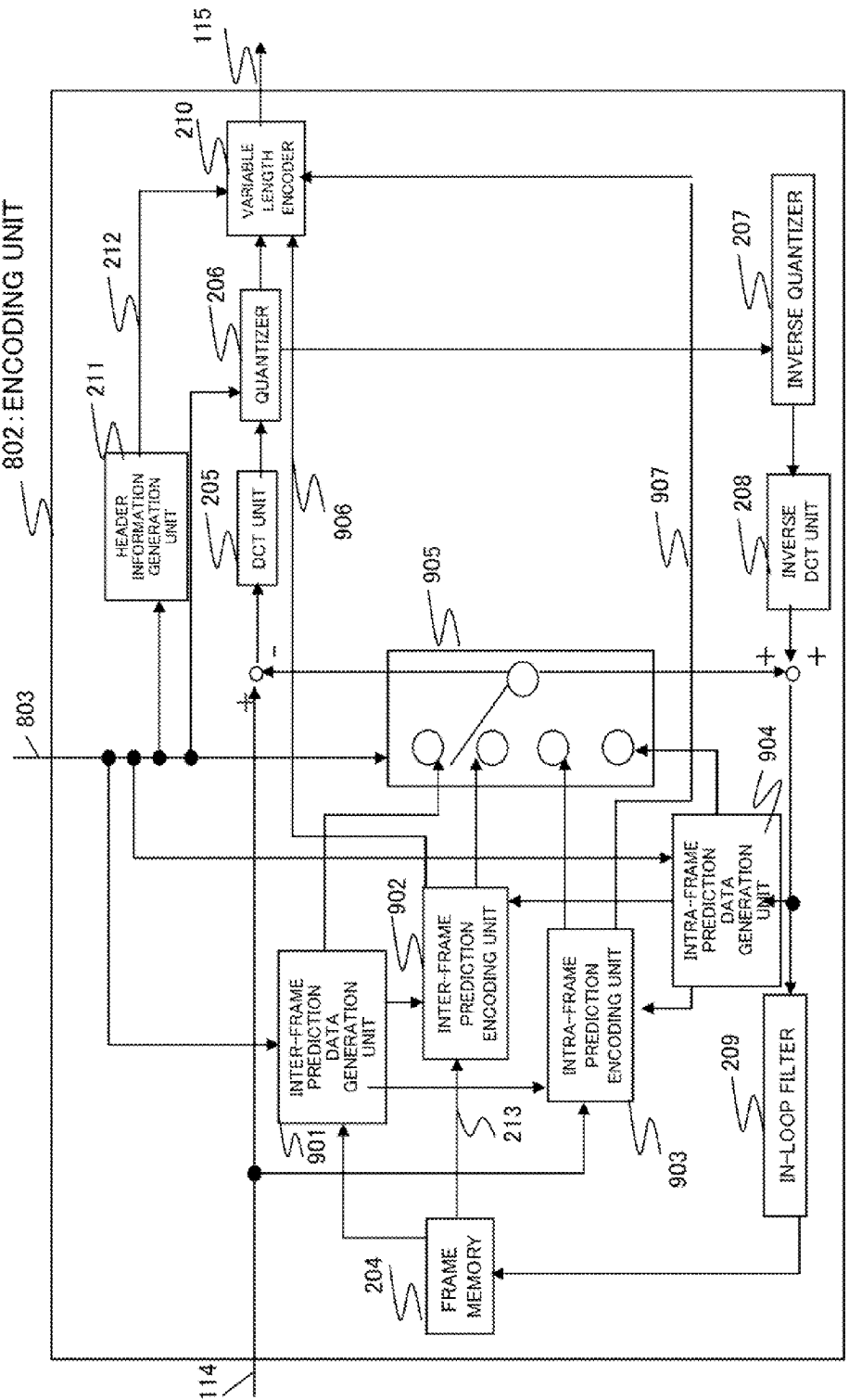
FIG. 9 is a diagram showing a configuration of an encoding unit of Exemplary Embodiment 6 of the present invention.

FIG. 9 shows a detailed configuration of an encoding unit 802 in Exemplary Embodiment 5 of the present invention shown in FIG. 8. In FIG. 9, the elements which are the same as those of FIG. 2 are depicted by the same reference numerals. In the following, the explanation of the same elements is fittingly omitted to avoid redundancy.

Referring to FIG. 9, an inter-frame prediction data generation unit 901 generates inter-frame prediction data, using a frame number and a motion vector in the conversion information 803 received from the conversion control unit 801. The inter-frame prediction data generation unit compares a difference between the inter-frame prediction data and the image data in the frame memory with a threshold value. In case a prediction residual is less than the threshold value, the inter-frame prediction data generation unit 902 adopts the frame number and the motion vector received in the conversion information 803.

In case the prediction residual is greater than the threshold value, an inter-frame prediction encoding unit 902 executes inter-frame prediction to determine a motion vector and a frame number 906 for supply to a variable length encoder 210.

In determining a motion vector and a frame number, the motion vector and the frame number, received in the conversion information 803, may be used as start point. An intra-frame prediction encoding unit 903 may also be used in place of the inter-frame prediction encoding unit 902.

An intra-frame prediction data generation unit 904 generates intra-frame prediction data, using the prediction mode received in the conversion information 803. The intra-frame prediction encoding unit 903 compares a difference between the intra-frame prediction data generated in the intra-frame prediction data generation unit 904 and image data in the vicinity of a block of interest with a threshold value.

In case the prediction error is less than the threshold value, the intra-frame prediction encoding unit 903 adopts the prediction mode received in the conversion information 803.

In case the prediction residual is greater than the threshold value, the intra-frame prediction encoding unit 903 executes intra-frame prediction to determine a prediction mode 907, for supply to the variable length encoder 210. At this time, the prediction mode, received in the conversion information 803, may be used as start point. The inter-frame prediction encoding unit 902 may be used in place of the intra-frame prediction encoding unit 903.

Except for those described above, the configuration as well as the operation is the same as in Exemplary Embodiments 1 to 5, and hence will not be explained. In the present Exemplary Embodiment, the image size of the input encoded data may speedily be converted to advantage and, in addition, the image quality may be enhanced in comparison with the case of the Exemplary Embodiments 1 to 5. In the present Exemplary Embodiment, the processing by the conversion control unit 801, decoding unit 103, size conversion unit 104 and the encoding unit 802 may be implemented by a program which is executed on a computer of the moving image conversion apparatus 800.

Exemplary Embodiment 7

Figure 10:
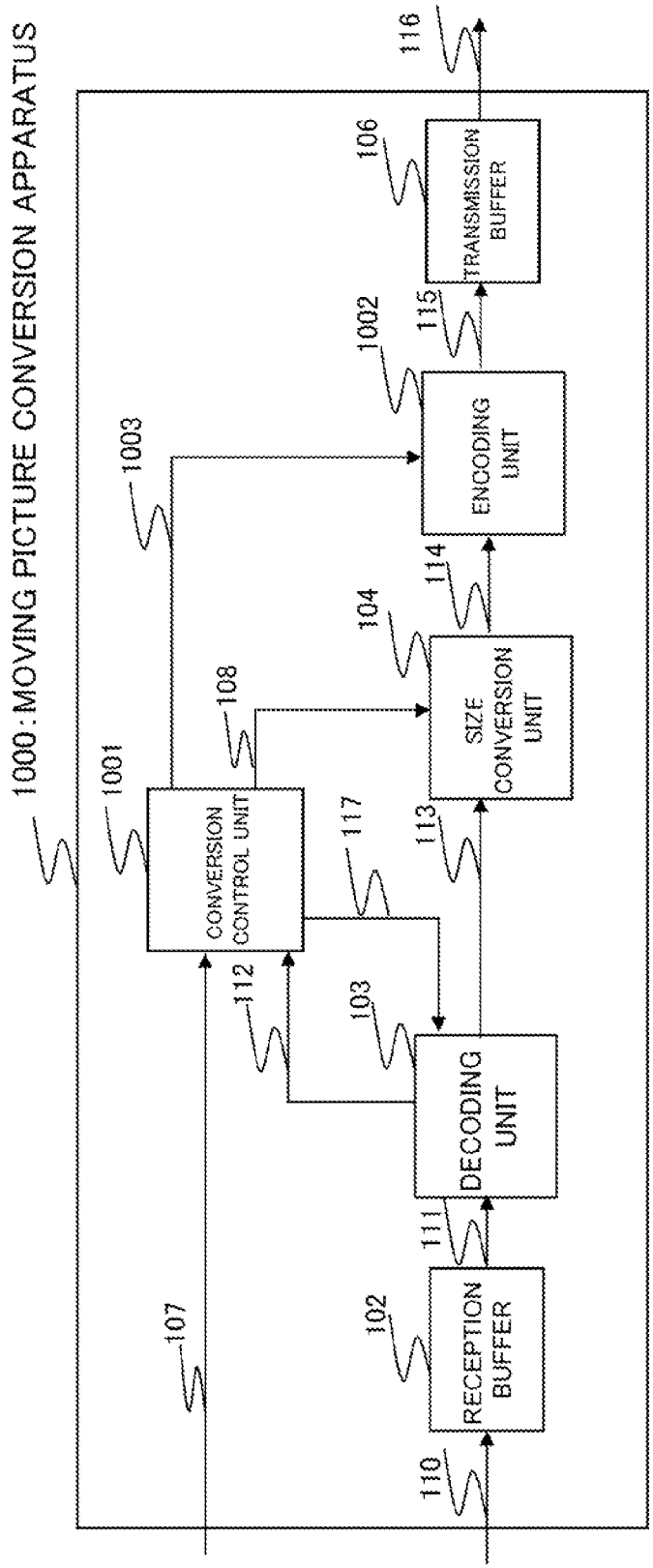
FIG. 10 is a diagram showing a configuration of a moving image conversion apparatus of Exemplary Embodiment 7 of the present invention.

The following describes Exemplary Embodiment 7 of the present invention. FIG. 10 shows a detailed configuration of a moving image conversion apparatus 1000 in Exemplary Embodiment 7 of the present invention. In FIG. 10, the elements which are the same as those of FIG. 1 are depicted by the same reference numerals. In the following, the explanation of the same elements is dispensed with in order to avoid redundancy.

Based upon a size conversion request 107 from outside and encoding parameters 112 output from a decoding unit 103, a conversion control unit 1001 sends a size conversion request 108 to a size conversion unit 104, and sends conversion information 1003 to an encoding unit 1002.

The conversion control unit 1001 sends to the to a size conversion unit 104, as the conversion information 1003 information including:
  image data size;
  frame type;
  prediction mode and direction of prediction;
  motion vector;
  reference frame information;
  block size;
  block type; and
  quantization step size.

It is possible for the conversion control unit 1001 to compare at least one of the image data size and the bit rate included in the size conversion request 107 supplied from outside, with the corresponding information before conversion, and to change a quantization step size to N or 1/N times that before conversion.

Figure 11:
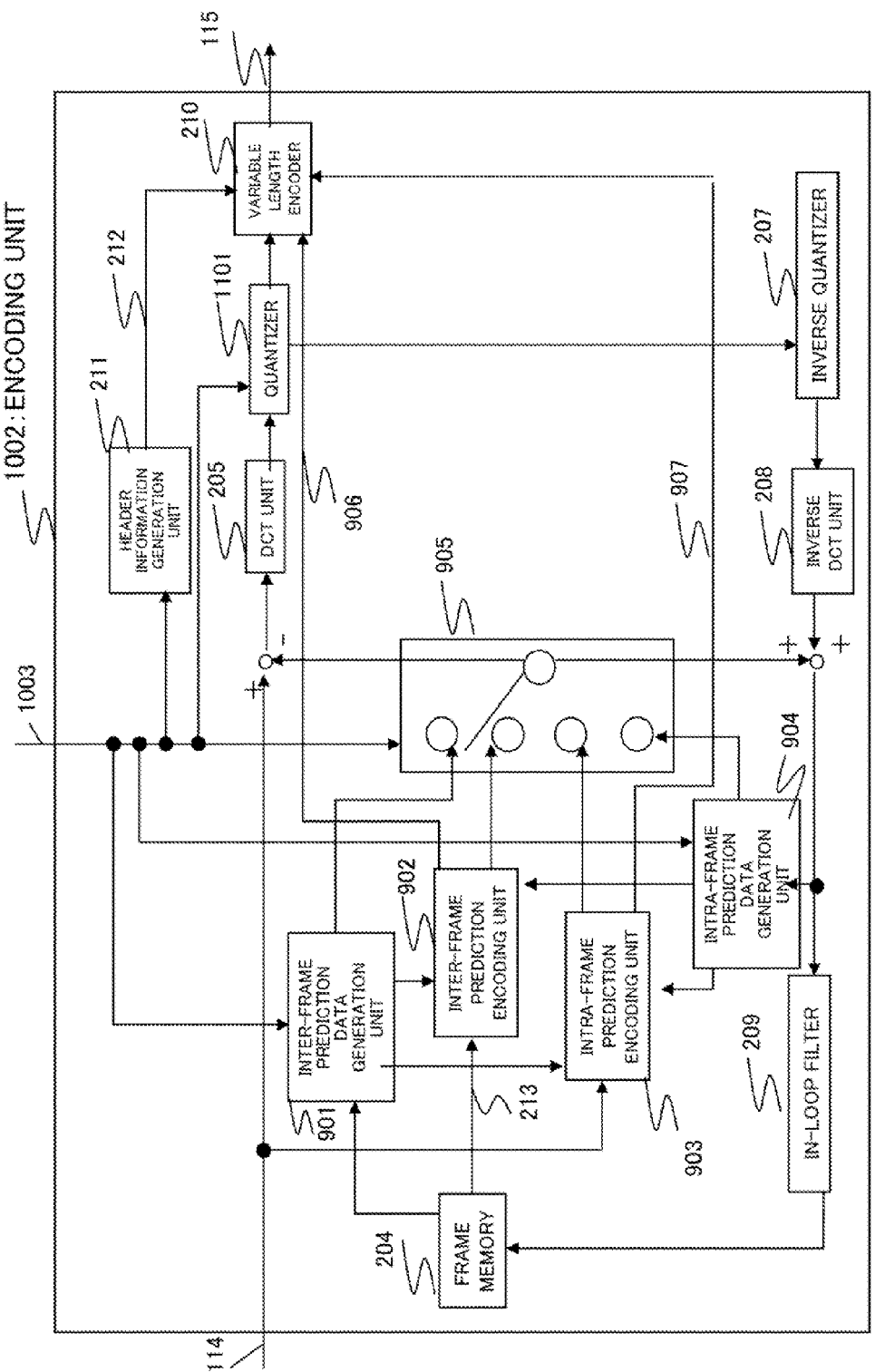
FIG. 11 is a diagram showing a configuration of an encoding unit of Exemplary Embodiment 7 of the present invention.

FIG. 11 shows a detailed configuration of an encoding unit 1002 in the present Exemplary Embodiment 7. In FIG. 11, the elements which are the same as those of FIG. 9 are depicted by the same reference numerals. In the following, the explanation of the same elements is dispensed with in order to avoid redundancy.

A quantizer 1101 executes quantization using the quantization step size included in the conversion information 1003 received from the conversion control unit 1001.

Except for those described above, the configuration as well as the operation is the same as in Exemplary Embodiments 1 to 6, and hence will not be explained. In the present Exemplary Embodiment, the image size of the input encoded data may be speedily converted to advantage in comparison with the case of the Exemplary Embodiments 1 to 6. In the present Exemplary Embodiment, the processing by the conversion control unit 1001, decoding unit 103, size conversion unit 104 and the encoding unit 102 may be implemented by a program which is executed on a computer of a moving image conversion apparatus 1000.

Exemplary Embodiment 8

Figure 12:
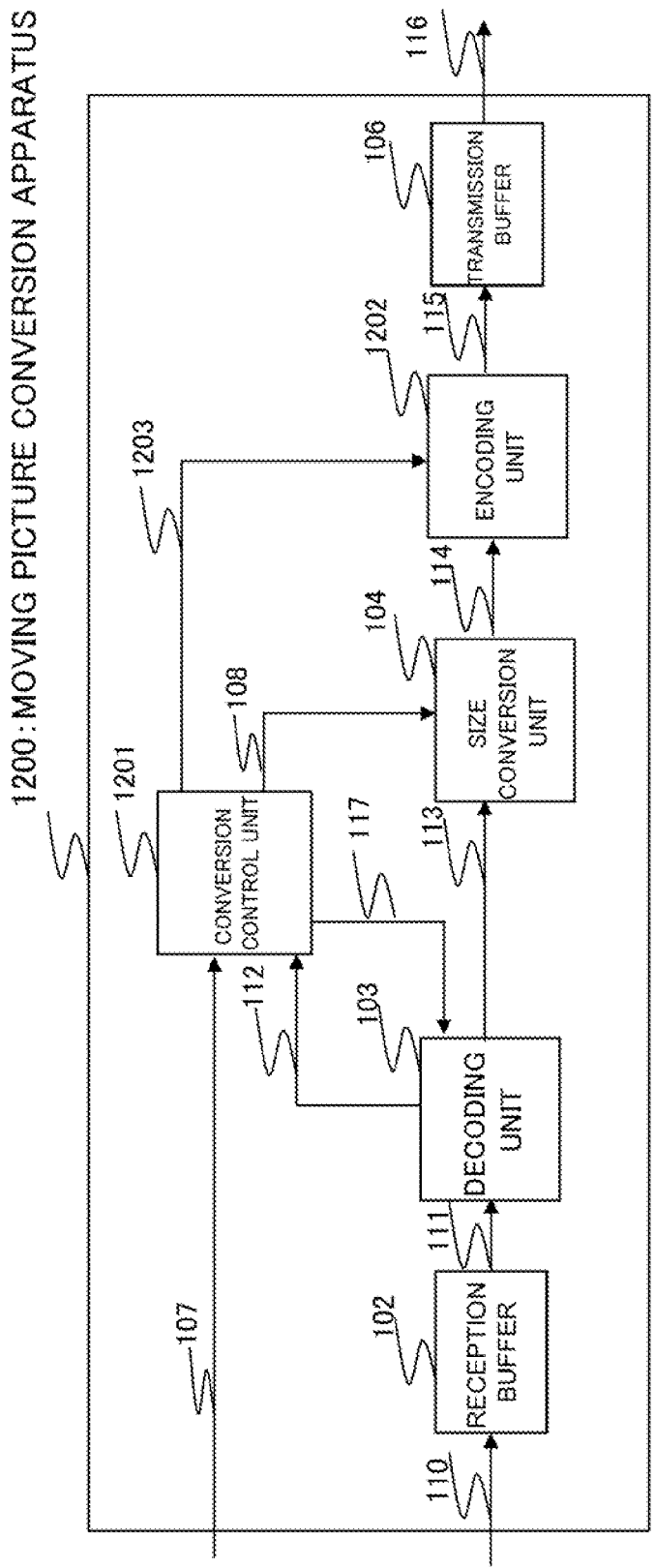
FIG. 12 is a diagram showing a configuration of a moving image conversion apparatus of Exemplary Embodiment 8 of the present invention.

The following describes Exemplary Embodiment 8 of the present invention. FIG. 12 shows a detailed configuration of a moving image conversion apparatus 1200 in Exemplary Embodiment 8 of the present invention. In FIG. 12, the elements which are the same as those of FIG. 1 are depicted by the same reference numerals. In the following, the explanation of the same elements is fittingly dispensed with in order to avoid redundancy.

Based upon a size conversion request 107 from outside and encoding parameters 112 from a decoding unit 103, a conversion control unit 1201 sends a size conversion request 108 to a size conversion unit 104, and sends conversion information 1203 to an encoding unit 1202.

The conversion control unit 1201 sends as the conversion information 1203, for example:
image data size;
frame type;
prediction mode and direction of prediction;
motion vector;
reference frame information;
block size;
block type;
bit rate; and
distribution of the code amount of input encoded data.

Figure 13:
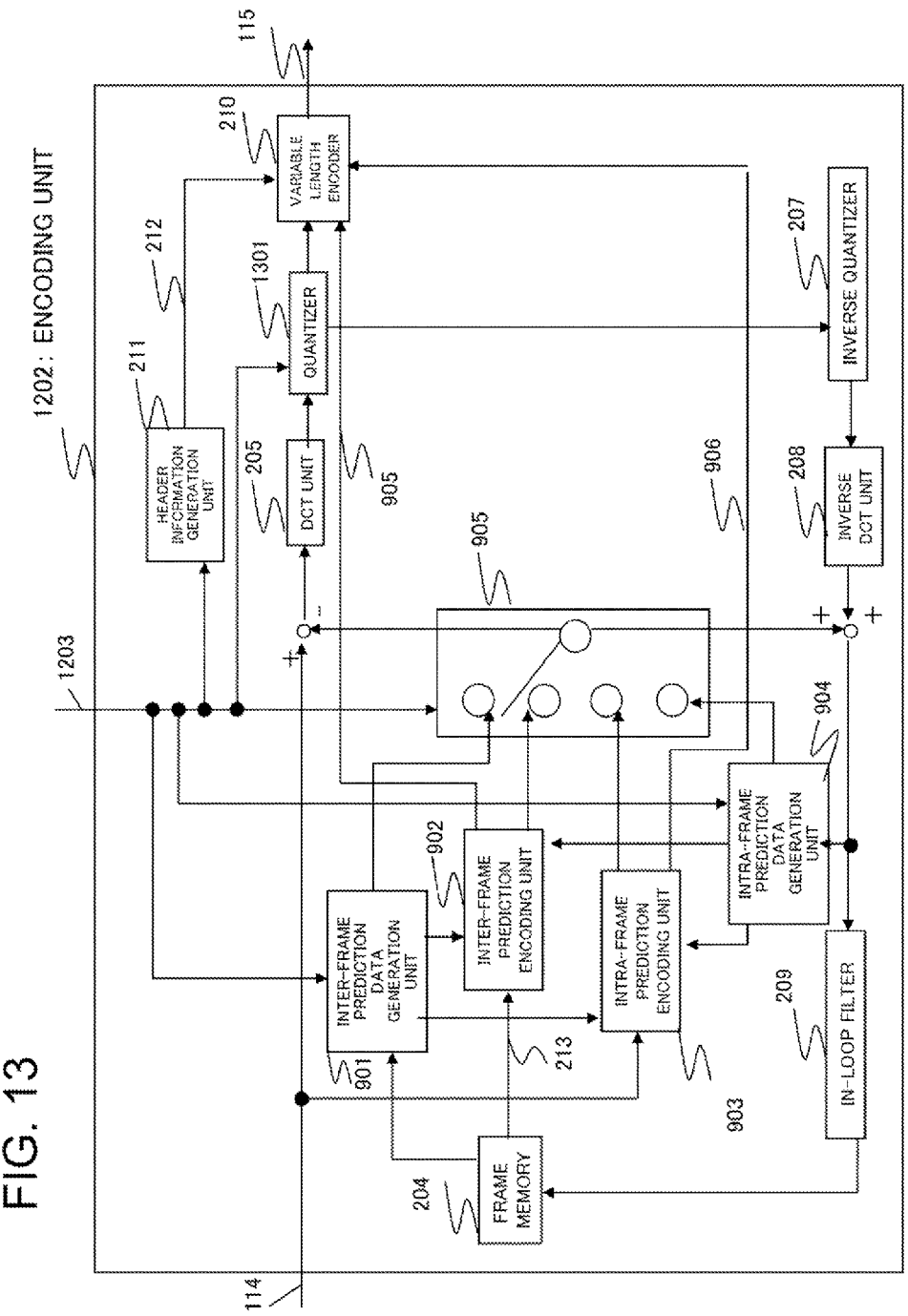
FIG. 13 is a diagram showing a configuration of an encoding unit of Exemplary Embodiment 8 of the present invention.

FIG. 13 shows a detailed configuration of the encoding unit 1202 in the present Exemplary Embodiment 8. In FIG. 13, the elements which are the same as those of FIG. 11 are depicted by the same reference numerals. In the following, the explanation of the same elements is dispensed with in order to avoid redundancy.

Referring to FIG. 13, a quantizer 1301 determines a target code amount of each block, using the distribution of the code amount of the input encoded data and the bit rate included in the conversion information 1203, received from the conversion control unit 1201. The quantizer 1301 accordingly determines the quantization step size to execute the quantization.

Except for those described above, the configuration as well as the operation is the same as in Exemplary Embodiments 1 to 7, and hence will not be explained. In the present Exemplary Embodiment, the image size of the input encoded data may be adjusted to advantage more satisfactorily in comparison with the case of the Exemplary Embodiments 1 to 7. In the present Exemplary Embodiment, the processing by the conversion control unit 1201, decoding unit 103, size conversion unit 104 and the encoding unit 1202 may be implemented by a program which is executed on a computer of the moving image conversion apparatus 1200.

Exemplary Embodiment 9

Figure 14:
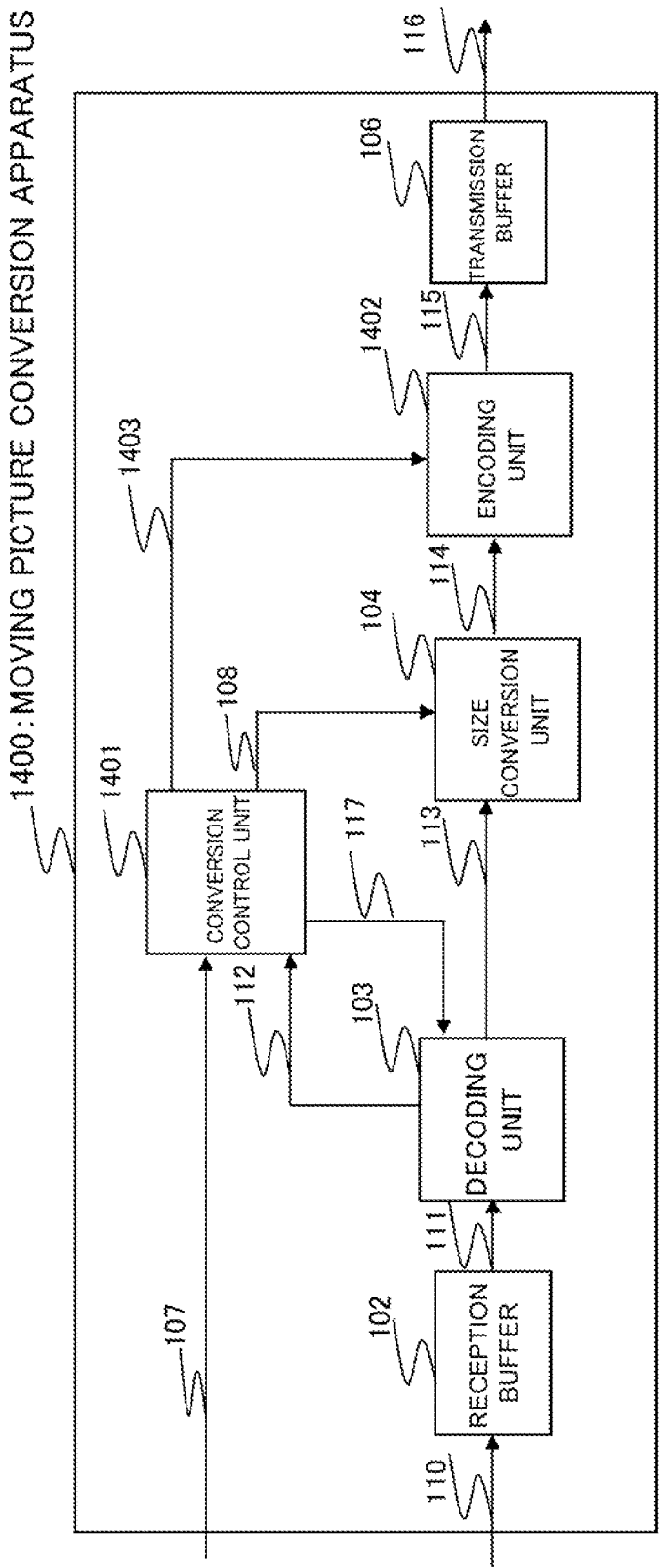
FIG. 14 is a diagram showing a configuration of a moving image conversion apparatus of Exemplary Embodiment 9 of the present invention.

The following describes Exemplary Embodiment 9 of the present invention. FIG. 14 shows a detailed configuration of a moving image conversion apparatus 1400 in Exemplary Embodiment 9 of the present invention. In FIG. 14, the elements which are the same as those of FIG. 1 are depicted by the same reference numerals. In the following, the explanation of the same elements is fittingly dispensed with in order to avoid redundancy.

Based upon a size conversion request 107 from outside and upon encoding parameters 112 from a decoding unit 103, a conversion control unit 1401 sends a size conversion request 108 to a size conversion unit 104, and sends conversion information 1403 to an encoding unit 1402.

As the conversion information 1403, image data size, frame type, prediction mode with direction of prediction, motion vector, reference frame information, block size, block type, bit rate and quantization information, are sent.

The quantization information includes information on whether or not to use the quantization step size of input encoded data or the distribution of the code amount of the input encoded data, information on quantization step size and information on bit rate.

In giving a decision on whether or not to use the quantization step size of the input encoded data, the quantization step size of input encoded data is not used in cases of a greater size conversion ratio, a greater ratio between the bit rate of the input encoded data and that of output encoded data or a greater difference between the increase/decrease of the size conversion ratio and the increase/decrease of the input/output bit rate ratio.

In giving a decision on whether or not to use the code amount distribution of the input encoded data, such code amount distribution is not used in case there is a greater difference present between the target bit rate and the output code amount.

Figure 15:
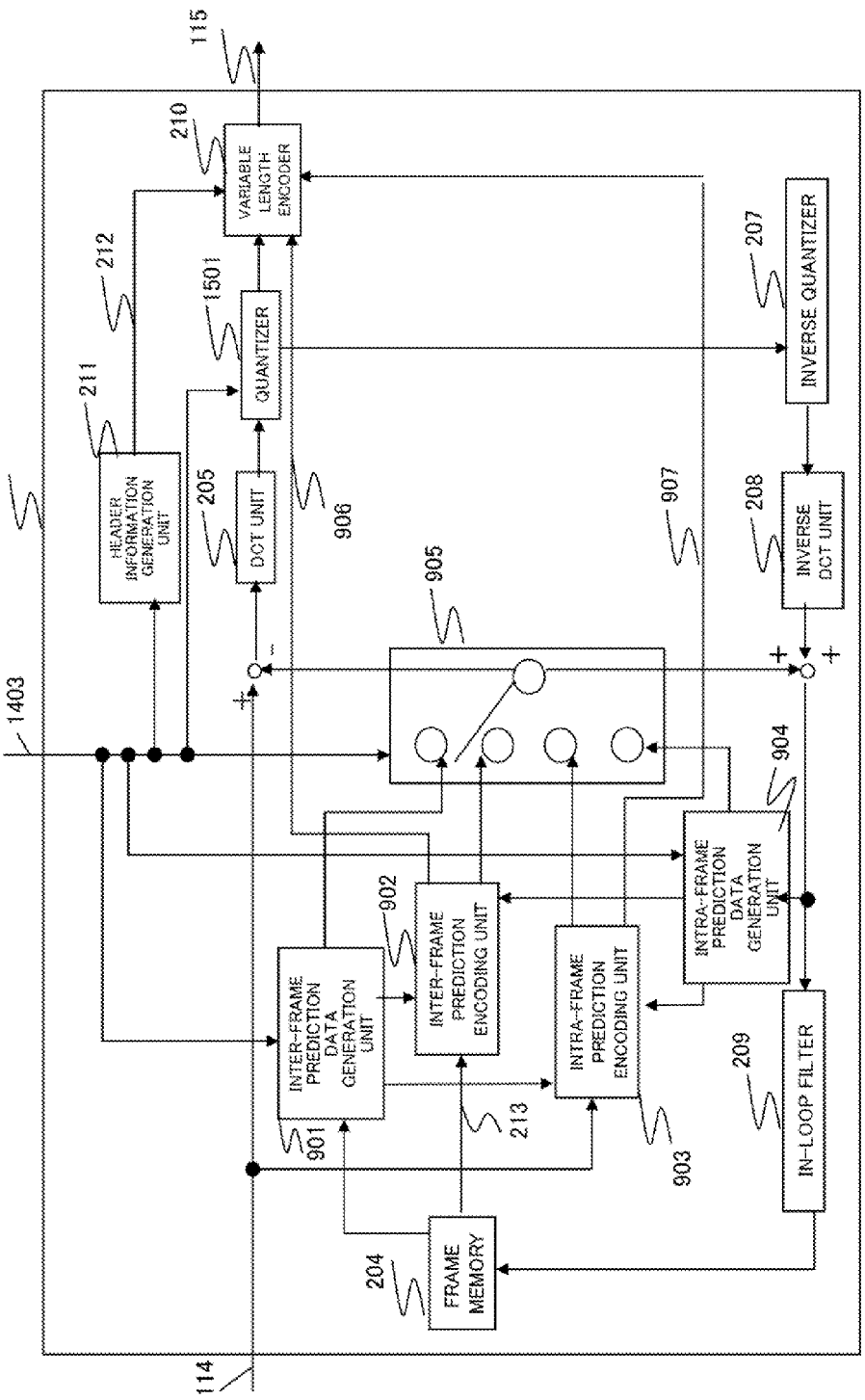
FIG. 15 is a diagram showing a configuration of an encoding unit of Exemplary Embodiment 9 of the present invention.

FIG. 15 shows a detailed configuration of the encoding unit 1402 in Exemplary Embodiment 9 of the present invention. In FIG. 15, the elements which are the same as those of FIG. 9 are depicted by the same reference numerals. In the following, the explanation of the same elements is fittingly dispensed with in order to avoid redundancy.

A quantizer 1501 executes quantization using information included in the conversion information 1403 received from the conversion control unit 1401. The conversion information 1403 may include the information on whether or not to use the quantization step size of input encoded data or code amount distribution, on quantization step size, on code amount distribution and on bit rate.

Specifically, the quantizer executes quantization based upon the information on whether or not to use the code amount distribution or the quantization step size of the input encoded data. If the code amount distribution or the quantization step size is to be used, the quantizer 1501 executes the quantization using the quantization step size of the input encoded data or the quantization step size obtained by calculations using the code amount distribution. If conversely the code amount distribution or the quantization step size is not used, the quantizer sets the quantization step size on its own based on the bit rate and accordingly executes the quantization.

Except for those described above, the configuration as well as the operation is the same as in Exemplary Embodiments 1 to 8, and hence is not explained. In the present Exemplary Embodiment, the image size of the input encoded data may speedily be converted to advantage and, in addition, the image quality may be enhanced in comparison with the case of the Exemplary Embodiment 7 or 8. In the present Exemplary Embodiment, the processing by the conversion control unit 1401, decoding unit 103, size conversion unit 104 and the encoder 1402 may be implemented by a program which is executed on a computer of the moving image conversion apparatus 1400.

Exemplary Embodiment 10

Figure 16:
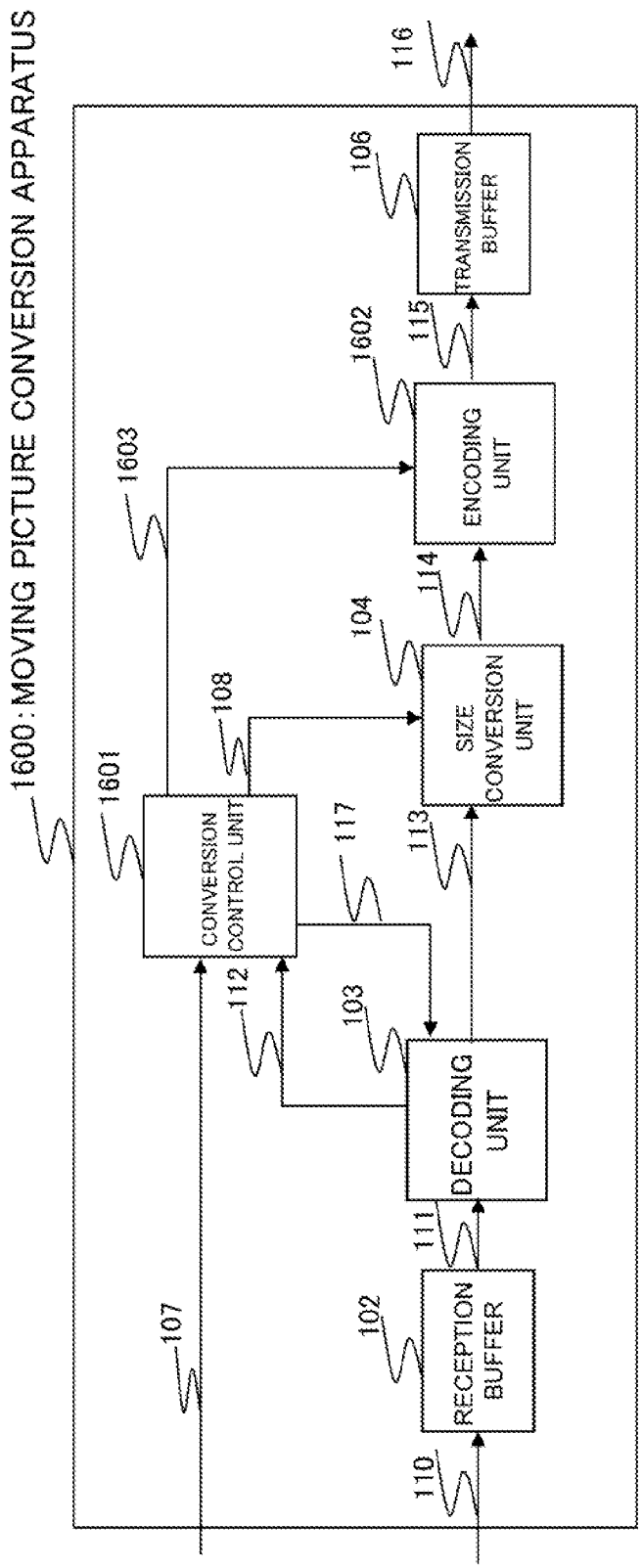
FIG. 16 is a diagram showing a configuration of a moving image conversion apparatus of Exemplary Embodiment 10 of the present invention.

The following describes Exemplary Embodiment 10 of the present invention. FIG. 16 shows a detailed configuration of a moving image conversion apparatus 1600 of Exemplary Embodiment 10 of the present invention.

Based upon a size conversion request 107 from outside, and encoding parameters 112 from a decoding unit 103, a conversion control unit 1601 sends a size conversion request 108 to a size conversion unit 104, and sends conversion information 1603 to an encoding unit 1602.

As the conversion information 1603, image data size, frame type, prediction mode with direction of prediction, motion vector, reference frame information, block size, block type, bit rate and filter processing information are sent.

The filter processing information may be exemplified by information on whether or not to execute filtering processing on image data before encoding or on image data being encoded and, in case of executing filtering processing, the information on the intensity of filtering or on an area where filtering is to be executed.

A decision on whether or not the filtering processing is to be executed, resort may be made using information on output bit rate with respect to image size after size conversion, information on whether the image size is to be enlarged or contracted, or information on whether bit rate of the input encoded data is high or low.

For example, a decision for executing or not executing the filtering processing, resort may be made using information in the input encoded data indicating whether the filtering processing is or is not to be executed. A decision for executing the filtering processing may be made in case of a low bit rate of the input encoded data or a low output bit rate with respect to the image size after size conversion. A decision for not executing the filtering processing may be made in case of a high bit rate of the input encoded data or a high output bit rate with respect to the image size after size conversion, or in case of reducing the image size.

Figure 17:
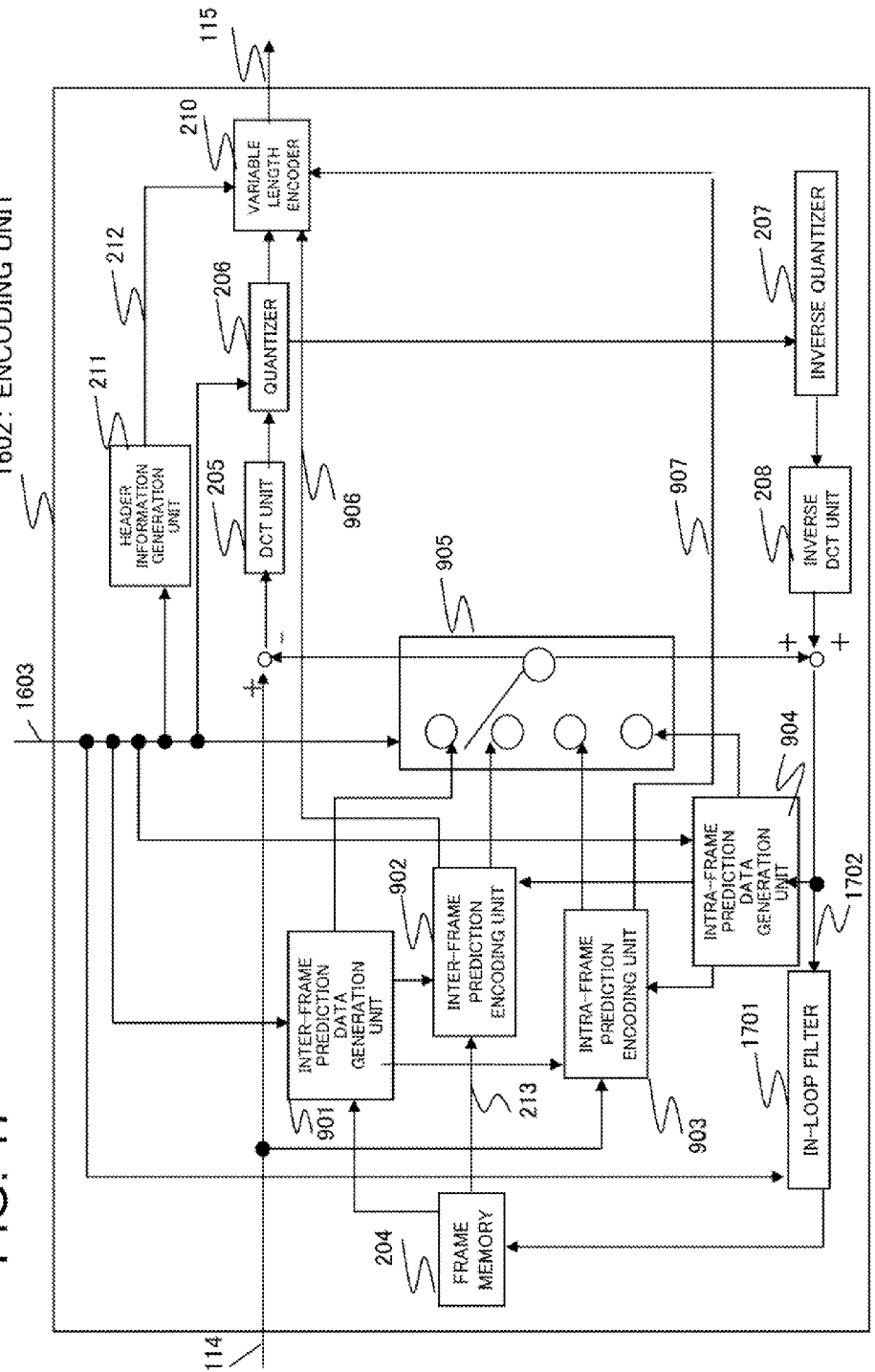
FIG. 17 is a diagram showing a configuration of an encoding unit of Exemplary Embodiment 10 of the present invention.

FIG. 17 shows a detailed configuration of the encoding unit 1602 in Exemplary Embodiment 10 of the present invention. In FIG. 17, the elements which are the same as those of FIG. 9 are depicted by the same reference numerals. In the following, the explanation of the same elements is dispensed with in order to avoid redundancy.

An in-loop filter 1701 executes filtering based on the conversion information 1603 received from the conversion control unit 1601. When instructed by the conversion information 1603 to execute the filtering, the in-loop filter 1701 executes filtering processing on image data 1702.

If there is information in the conversion information 1603 on filtering intensity or on an area where filtering is to be performed, the in-loop filter 1701 executes the filtering processing in accordance with the conversion information 1603.

If instructed by the conversion information 1603 not to execute the filtering, the in-loop filter 1701 sends the image data 1702 as it is to a frame memory 204.

In the present Exemplary Embodiment, executing or not executing the filtering processing on image data being encoded has been explained. It is to be understood that this explanation is only by way of illustration of the present invention and not for limiting the invention. As will be apparent from the principle of the moving image conversion apparatus of the present invention, the foregoing explanation may apply in giving a decision on whether or not the filtering processing is to be executed on pre-encoding image data as well.

Except for those described above, the configuration as well as the operation is the same as in Exemplary Embodiments 1 to 9, and hence is not explained. In the present Exemplary Embodiment, the image size of the input encoded data may be converted to advantage expeditiously and, in addition, the image quality may be enhanced in comparison with the case of the Exemplary Embodiments 1 to 9. In the present Exemplary Embodiment, the processing by the conversion control unit 1601, decoding unit 103, size conversion unit 104 and the encoder 1602 may be implemented by a program which is executed on a computer of the moving image conversion apparatus 1600.

Exemplary Embodiment 11

Figure 18:
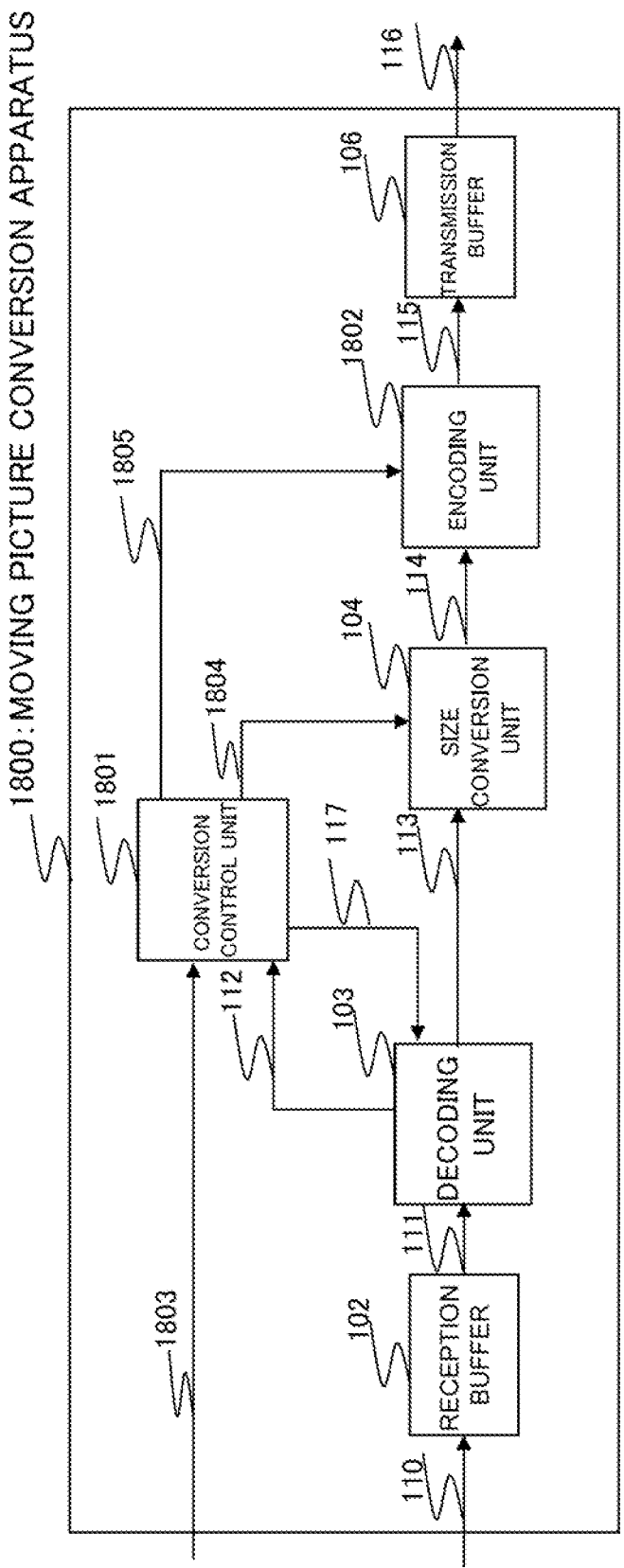
FIG. 18 is a diagram showing a configuration of a moving image conversion apparatus of Exemplary Embodiment 11 of the present invention.

The following describes Exemplary Embodiment 11 of the present invention. FIG. 18 shows a detailed configuration of a moving image conversion apparatus 1800 in Exemplary Embodiment 11 of the present invention. Based upon a size conversion request 1803 from outside and encoding parameters 112 from a decoding unit 103, a conversion control unit 1801 sends conversion information 1804 to a size conversion unit 104, and sends conversion information 1805 to an encoding unit 1802.

The conversion control unit 1801 sends the conversion information 1804, inclusive of a request for size conversion and for frame skip, to the size conversion unit 104, based upon the size conversion request 1803.

The conversion information 1804 includes;
multiplication factor;
image size after size conversion;
bit rate;
encoding information; and
frame rate information.

The frame rate information includes:
frame rate information of both of input encoded data and output encoded data;
the number of frames to be decimated of the input encoded data; and
timing information.

On receipt of the encoding parameters 112 from the decoding unit 103, the conversion control unit 1801 sends the conversion information 1805 to the encoding unit 1802, based upon the size conversion request 1803.

The conversion information 1805 includes:
image data size;
frame type;
prediction mode and direction of prediction;
motion vector;
reference frame information;
block size;
block type;
bit rate;
quantization information;
filtering processing information; and
frame skip information.

The frame skip information includes:
frame rate information for both of input encoded data and output encoded data;
information on the number of frames of the input encoded data to be decimated; and
timing information.

The conversion control unit 1801 determines whether or not the frame rate is to be dropped, and notifies the encoding unit 1802 of whether or not to execute encoding on a per frame basis.

Taking an example case of doubling the image size and decimating every other frame, by way of dropping the frame rate, the method of generating a motion vector and the reference frame information will now be explained. It should be noted however that, as will be apparent from the principle of the present invention, the size as well as the frame rate different from those given above may also be used.

<Case 1>

Regarding the reference frame, if a frame in question references a frame to be decimated, a past output fame or a frame to be output in future with respect to the frame being decimated is referenced. Since it is also necessary to decimate the reference frame number, the frame number is decremented a number equal to the number of frames to be decimated. In case the frame in question is referencing a frame to be output, the frame to be output is referenced in an unchanged state. Since it is necessary to decimate the frame number in this case as well, the frame number is decremented a number equal to the number of the frames to be decimated.

Regarding the motion vector, since the image size is doubled, the motion vector of the input encoded data is doubled. If the frame in question is referencing a frame to be output, the motion vector size is to remain equal to a value indicated by the image size ratio.

If a frame in question references a frame to be decimated, a past output fame or a frame to be output in future with respect to the frame to be decimated is referenced. For example, if the frame to be decimated is a frame one frame before the frame in question, and a frame two frames before the frame in question is referenced, the motion vector is made equal to two times a value as indicated from the image size ratio.

For example, if the frame to be decimated is a frame three frames before the frame in question, and a frame which is two frames before the frame in question is referenced, the motion vector is further made equal to 0.66 times a value as indicated from the image size ratio.

<Case 2>

Regarding a reference frame, if the frame in question is referencing a frame to be decimated, a frame to be output, referenced by the frame to be decimated, is referenced. Since it is necessary to decimate the reference frame number as well, the frame number is decremented a number equal to the number of the frames to be decimated.

In case the frame in question is referencing a frame to be output, the frame to be output is referenced in an unchanged state. Since it is necessary to decimate the reference frame number in this case as well, the frame number is decremented a number equal to the number of the frames to be decimated.

Turning now to the motion vector, since the image size is doubled, the motion vector of the input encoded data is doubled. In case the frame in question is referencing a frame to be output, the size of the motion vector is to remain equal to a value indicated by the image size ratio.

In case the frame in question is referencing a frame to be decimated, a past output fame or a frame to be output in future with respect to the frame being decimated is referenced. The motion vector in the input encoded data of the frame in question is summed to the motion vector of the frame to be decimated.

If notified by the conversion control unit 1801 of the conversion information 1804 including a frame skip request, the size conversion unit 104 discards image data 113, supplied thereto from the decoding unit 103, without converting its size. That is, the size conversion unit does not transmit the image data to the encoding unit 1802.

The encoding unit 1802 generates output encoded data based upon the conversion information 1805 and image data 114. Except for those described above, the configuration as well as the operation is the same as in the Exemplary Embodiments 1 to 10, and hence will not be explained.

With the present Exemplary Embodiment, it is possible to speedily change the image size of the input encoded data in case of changing the frame rates of the input encoded data and the output encoded data. In the present Exemplary Embodiment, the processing in the conversion control unit 1801, decoding unit 103, size conversion unit 104 and the encoding unit 1802 may be implemented by a program which is executed on a computer of the moving image conversion apparatus 1800.

Exemplary Embodiment 12

Figure 19:
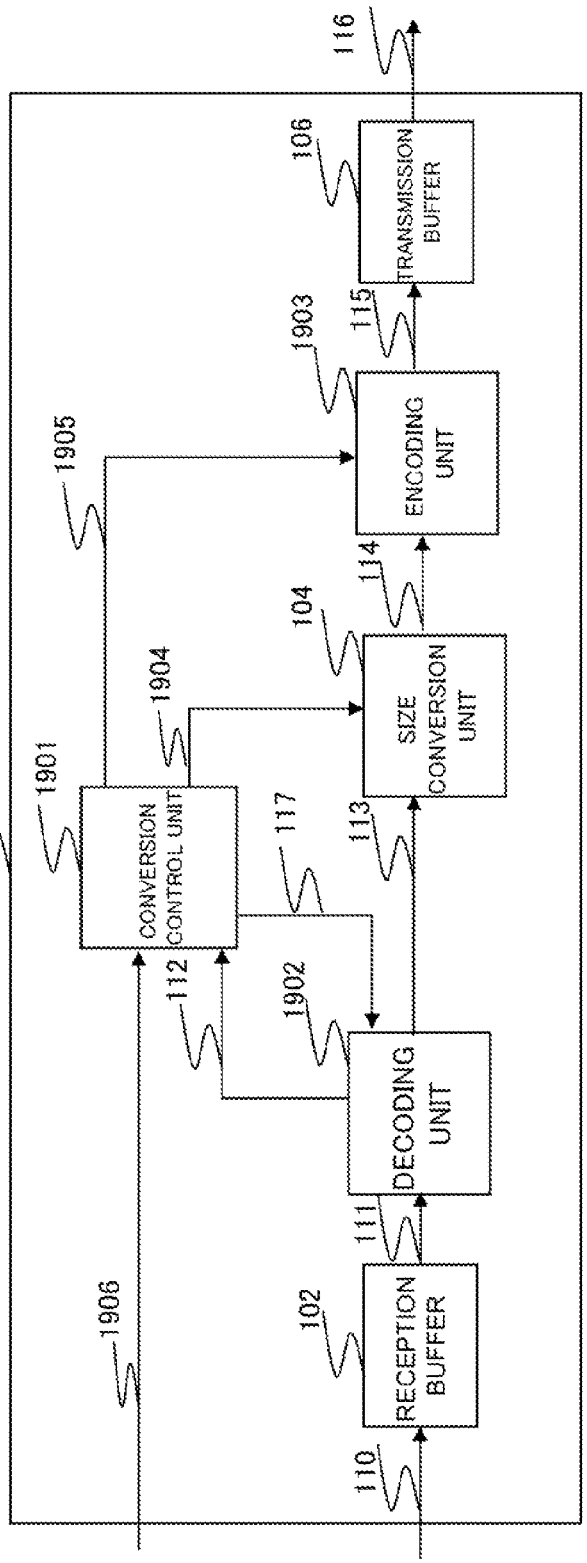
FIG. 19 is a diagram showing a configuration of a moving image conversion apparatus of Exemplary Embodiment 12 of the present invention.

The following describes Exemplary Embodiment 12 of the present invention. FIG. 19 shows a detailed configuration of a moving image conversion apparatus 1900 in Exemplary Embodiment 12 of the present invention. In FIG. 19, the elements which are the same as those of FIG. 1 are depicted by the same reference numerals. In the following, the explanation of the same elements is dispensed with in order to avoid redundancy.

Based upon a size conversion request 1906 from outside and encoding parameters 112 from a decoding unit 1902, a conversion control unit 1901 sends a size conversion request 1904 to a size conversion unit 104, and sends conversion information 1905 to an encoding unit 1903.

The size conversion request 1904 includes size conversion information as well as information regarding the encoding scheme for output encoded data and that regarding the encoding scheme for input encoded data.

On receipt of encoding parameters 112 from the decoding unit 1902, the conversion control unit 1901 sends image data size, frame type, prediction mode with direction of prediction, motion vector, reference frame information, block size, block type, bit rate, quantization information and filtering processing information, to the encoding unit 1903, based upon the size conversion request 1904.

If, in the size conversion request 1904, the input encoding scheme is the same as the output encoding scheme, the conversion control unit 1901 converts the encoding parameter 112 by a method explained in the above mentioned Exemplary Embodiments 1 to 11. The conversion control unit then supplies the so converted encoding parameters 112 to the encoding unit 1903.

If, in the size conversion request 1904, the input encoding scheme is different from the output encoding scheme, the conversion control unit 1901 converts the prediction mode with direction of prediction, motion vector, reference frame information, block size, block type, picture type, quantization information and filtering processing information so that they fit in with those of the output encoding scheme.

As regards the prediction mode, if the prediction mode for the input encoding scheme is not matched to that of the output encoding scheme, the prediction mode and the direction of prediction are found based on approximation to the closet prediction mode and direction.

As regards the motion vector, its upper/lower limit values and measure are adjusted for matching to those of the output encoding scheme As regards the reference frame information, if say the reference frame information of the input encoding scheme is not matched in the output encoding scheme, the frame number is increased or decreased to the maximum value or the minimum value of the output encoding scheme.

The reference frame information irrelevant to the output encoding scheme is made not to be sent to the encoding unit 1903. Or, relevant information portions are re-encoded without using the information of the input encoded data.

As regards the block size, there may be a case where a single prediction mode/prediction direction as well as a single motion vector may be specified for each of 4×4 blocks in the input encoding scheme but just a single prediction mode/prediction direction or just a single motion vector may be specified for an 8×8 block or for a 16×16 block in the output encoding scheme. In such case, the prediction mode/prediction direction or the motion vector is synthesized as shown in the Exemplary Embodiment 4.

As regards the picture type, if a certain picture type is present in the input encoding scheme but is not present in the output encoding scheme, the frame in question is re-encoded. Or, if the picture type difference is merely the addition of the information irrelevant to the output encoding scheme, the information is not sent but the picture type is approximated and sent to the encoding unit 1903.

As regards the quantization step, it is converted as the upper/lower limit values or the meaning of the measure, for example, whether the scale is a log scale or whether the number is a multiple number, is taken into account.

As regards the filtering processing information, no filtering operation is carried out if the information is present in the input encoding scheme and is not present in the output encoding scheme. Or, if simply the information irrelevant to the output encoding scheme is added, such information is not sent and the filtering processing information is generated.

Except for those described above, the configuration and the operation are the same as those of the above Exemplary Embodiments 1 to 11, and hence the explanation is dispensed with. In the present Exemplary Embodiment, it is possible to speedily change the image size of the input encoded data in case the input encoding scheme differs from the output encoding scheme. In the present Exemplary Embodiment, the processing by the conversion control unit 1901, decoding unit 1902, size conversion unit 104 or the encoding unit 1903 may be implemented by a program which is executed on a computer of the moving image conversion apparatus 1900.

The whole or part of the Exemplary Embodiments disclosed above can be described as, but not limited to, the following Supplementary notes.

(Supplementary Note 1)
  A image conversion apparatus comprising:
    means that decodes encoded data received;
    means that changes the size of image data decoded; and
    means that re-uses, in encoding the image data after size change, at least one of a prediction mode, a block type, a motion vector and reference frame information of the encoded data received, for the encoding.

(Supplementary Note 2)
  The image conversion apparatus according to Supplementary note 1, further comprising:
    means that expands or contracts, in encoding the image data after size change, at least one of the motion vector and the block type of the encoded data received, according to image size ratio between the image size before the size change and that after the size change.

(Supplementary Note 3)
  The image conversion apparatus according to Supplementary note 1, further comprising:
    means that approximates, in encoding the image data after the size change, the prediction mode, in case the prediction mode of the encoded data received is unable to be used as it is after the size change.

(Supplementary Note 4)
  The image conversion apparatus according to any one of Supplementary notes 1 to 3, further comprising:
    means that splits or synthesizes at least one of the prediction mode and the motion vector, for re-using, according to image size ratio between the image size before the size change and that after the size change.

(Supplementary Note 5)
  The image conversion apparatus according to any one of Supplementary notes 1 to 4, further comprising:
    means that executes re-prediction, using, as start point, at least one of the motion vector and the prediction mode re-used.

(Supplementary Note 6)
  The image conversion apparatus according to Supplementary note 5, further comprising:
    means that uses, in executing re-prediction with the re-used motion vector as start point, direction of the motion vector.

(Supplementary Note 7)
  The image conversion, apparatus according to any one of Supplementary notes 1 to 6, further comprising:
    means that executes the re-prediction in case prediction error is not less than a predetermined threshold value.

(Supplementary Note 8)
  The image conversion apparatus according to any one of Supplementary notes 1 to 7, further comprising:
    means that re-uses, in encoding the image data after size change, quantization step size of received encoded data.

(Supplementary Note 9)
  The image conversion apparatus according to any one of Supplementary notes 1 to 7, further comprising:
    means that re-uses, in encoding the image data after size change, code amount distribution of the received encoded data.

(Supplementary Note 10)
  The image conversion apparatus according to Supplementary note 8 or 9, further comprising:
    means that determines, in encoding the image data after size change, whether or not at least one of quantization step size and code amount distribution of the input image data is to be re-used.

(Supplementary Note 11)
  The image conversion apparatus according to any one of Supplementary notes 1 to 10, further comprising:
    means that changes, in encoding the image data after size change, bit rate of the received encoded data.

(Supplementary Note 12)
  The image conversion apparatus according to any one of Supplementary notes 1 to 11, further comprising:
    means that determines, in encoding the image data after size change, whether or not filtering is to be applied to at least one of the image data after the size change and the image data being encoded.

(Supplementary Note 13)
  The image conversion apparatus according to any one of Supplementary notes 1 to 12, further comprising:
    means that re-uses, in encoding the image data after size change, picture type of the received encoded data.

(Supplementary Note 14)
  The image conversion apparatus according to any one of Supplementary notes 1 to 13, wherein frame rate is converted in encoding the image data after size change.

(Supplementary Note 15)
  The image conversion apparatus according to any one of Supplementary notes 1 to 14, wherein decoding scheme and encoding scheme are different from each other.

(Supplementary Note 16)
  A image conversion method comprising:
    decoding encoded data received into image data;
    changing size of the image data decoded; and re-using, in encoding the image data after size conversion, at least one of prediction mode, block type, motion vector and reference frame information of the encoded data received, for the encoding.

(Supplementary Note 17)

The image conversion method according to Supplementary note 16, further comprising:
expanding or contracting, in encoding the image data after size change, at least one of the motion vector and the block type of the encoded data received, for matching to a size ratio between the image size before the size change and that after the size conversion.

(Supplementary Note 18)

The image conversion method according to Supplementary note 16, further comprising:
approximating, in encoding the image data after the size change, the prediction mode in case the prediction mode of the encoded data received is unable to be used as it is after the size conversion.

(Supplementary Note 19)

The image conversion method according to any one of Supplementary notes 16 to 18, further comprising:
splitting or synthesizing at least one of the prediction mode and the motion vector, for re-using, for matching to a size ratio between the image size before the size conversion and that after the size change.

(Supplementary Note 20)

The image conversion method according to any one of Supplementary notes 16 to 19, further comprising:
determining, in encoding the image data after size change, whether or not at least one of quantization step size and code amount distribution of the input encoded data is to be re-used.

(Supplementary Note 21)

The image conversion method according to any one of Supplementary notes 16 to 20, further comprising
converting frame rate in encoding the image data after size change.

(Supplementary Note 22)

A program causing a computer to execute the processing comprising:
decoding encoded data received;
changing size of image data decoded; and
re-using, in encoding the image data having size thereof changed, at least one of prediction mode, block type, motion vector and reference frame information of the encoded data received, for the encoding.

(Supplementary Note 23)

The program according to the Supplementary note 22 causing the computer to execute the processing comprising
expanding or contracting, in encoding the image data after size change, at least one of the motion vector and the block type of the encoded data received, for matching to a size ratio between the image size before the size change and that after the size change.

(Supplementary Note 24)

The program according to the Supplementary note 22 causing the computer to execute the processing comprising
approximating, in encoding the image data after the size change, the prediction mode in case the prediction mode of the encoded data received is unable to be directly used after the size change.

(Supplementary Note 25)

The program according to any one of the Supplementary notes 22 to 24 causing the computer to execute the processing comprising
splitting or synthesizing at least one of the prediction mode and the motion vector, for re-using, according to size ratio between the image size before the size change and that after the size change.

(Supplementary Note 26)

The program according to any one of the Supplementary notes 22 to 25 causing the computer to execute the processing comprising
determining, in encoding the image data after size change, whether or not at least one of the quantization step size and the distribution of the code amount of the input image data is to be re-used.

(Supplementary Note 27)

The program according to any one of the Supplementary notes 22 to 26 causing the computer to execute the processing comprising
converting the frame rate in encoding the image data after size change.

(Supplementary Note 28)

A image conversion apparatus comprising:
a decoding unit that decodes encoded data received into image data;
a conversion control unit that receives a size conversion request from outside the apparatus or an encoding parameter set from the decoding unit to control a size conversion unit or an encoding unit;
a size conversion unit that executes size conversion of the image data entered from the decoding unit under a command from the conversion control unit; and
an encoding unit that generates encoded data from the image data entered from the size conversion unit, under a command from the conversion control unit;
the encoding unit, in encoding the image data having size thereof changed by the size conversion unit, re-using, at least one of prediction mode, block type, motion vector and reference frame information of the encoded data received.

(Supplementary Note 29)

The image conversion apparatus according to Supplementary note 28, wherein the conversion control unit sends a size conversion request to the size conversion unit and sends conversion information to the encoding unit, based upon the size conversion request entered from outside the apparatus, and upon the encoding parameter from the decoding unit;
the size conversion unit converting the image size of image data received from the decoding unit, using a multiplication factor or an input/output image size in size conversion request information from the conversion control unit, to deliver the image data after size conversion to the encoding unit;
the encoding unit including
an inter-frame prediction data generation unit that executes inter-frame prediction, using the conversion information received from the conversion control unit and image data from a frame memory, to generate prediction data which is supplied to a switch;
an intra-frame prediction data generation unit that executes intra-frame prediction, using the conversion information received from the conversion control unit and the image data received from the size conversion unit, to generate prediction data which is supplied to a switch;
the switch changing over between the prediction data generated by the inter-frame prediction data generation unit and the prediction data generated by the intra-frame prediction data generation unit, in accordance with a command from the conversion control unit, so that the prediction data will be able to be sent to a discrete cosine transform unit, an in-loop filter and to the intra-frame prediction data generation unit;

a quantizer that determines the quantization step with a bit rate commanded by the conversion control unit as a goal;

a header information generator that generates the header information based upon the conversion information received from the conversion control unit; and a variable length encoder that variable length encodes an output of the quantizer based upon the header information from the header information generator.

The disclosures of the Patent Documents 1 to 4 are to be incorporated herein by reference. The particular exemplary embodiments or examples may be modified or adjusted within the gamut of the entire disclosure of the present invention, inclusive of claims, based on the fundamental technical concept of the invention. Further, a wide variety of combinations or selection of elements disclosed herein may be made within the scope of coverage by the claims. That is, the present invention may encompass various modifications or corrections that may occur to those skilled in the art in accordance with and within the entire disclosure of the present invention, inclusive of claims, and the technical concept of the present invention.

EXPLANATION OF REFERENCE NUMERALS 100 moving image conversion apparatus
101 conversion control unit
102 reception buffer
103 decoding unit
104 size conversion unit
105 encoding unit
106 transmission buffer
107 size conversion request
108 size conversion request
109 conversion information
110 input encoded data
111 input encoded data
112 set of encoding parameters
113 image data
114 image data
115 encoded data
116 encoded data
117 encoding information
201 inter-frame prediction data generation unit
202 intra-frame prediction data generation unit
203 switch
204 frame memory
205 DCT (Discrete Cosine Transform) unit
206 quantizer
207 inverse quantizer
208 inverse DCT unit
209 in-loop filter
210 variable length encoder
211 header information generator
212 header information
213 image data
300 moving image conversion apparatus
301 conversion control unit
400 moving image conversion apparatus
401 conversion control unit
500 moving image conversion apparatus
501 conversion control unit
600 moving image conversion apparatus
601 conversion control unit
602 encoding unit
603 conversion information
701 inter-frame prediction encoding unit
702 intra-frame prediction encoding unit
703 motion vector and reference frame information
704 prediction mode
800 moving image conversion apparatus
801 conversion control unit
802 encoding unit
803 conversion information
901 inter-frame prediction data generation unit
902 inter-frame prediction encoding unit
903 intra-frame prediction data generation unit
904 intra-frame prediction encoding unit
905 switch
906 motion vector and reference frame information
907 prediction mode
1000 moving image conversion apparatus
1001 conversion control unit
1002 encoding unit
1003 conversion information
1101 quantizer
1200 moving image conversion apparatus
1201 conversion control unit
1202 encoding unit
1203 conversion information
1301 quantizer
1400 moving image conversion apparatus
1401 conversion control unit
1402 encoding unit
1403 conversion information
1501 quantizer
1600 moving image conversion apparatus
1601 conversion control unit
1602 encoding unit
1603 conversion information
1701 in-loop filter
1702 image data
1800 moving image conversion apparatus
1801 conversion control unit
1802 conversion request
1803 size conversion/frame skip request
1804 conversion information
1900 moving image conversion apparatus
1901 conversion control unit
1902 decoding unit
1903 encoding unit
1904 conversion request
1905 conversion information

What is claimed is:

1. An image conversion apparatus comprising:

a decoding unit that receives first encoded data and decodes said first encoded data into image data;

a size conversion unit that receives said image data from said decoding unit and changes a size of said image data;

an encoding unit that receives said image data having said size thereof changed by said size conversion unit and encodes said image data, said encoding unit re-using prediction mode and block size information of said first encoded data for intra-frame prediction, said encoding unit re-using motion vector, said block size, and reference frame information of said first encoded data for inter-frame prediction; and a conversion control unit that receives a size conversion request and a set of encoding parameters supplied from said decoding unit, said conversion control unit supplying said size conversion request to said size conversion unit, said conversion control unit generating conversion information including at least one of said prediction mode, said block size, said motion vector and said reference frame information from said encoding parameters to supply said conversion information to said encoding unit, wherein said conversion control unit configures a prediction direction approximated to a corresponding prediction direction of said first encoded data if said corresponding prediction direction is not present in said intra-frame prediction mode of said image data having said size thereof changed.

2. The image conversion apparatus according to claim 1, wherein in encoding said image data having said size thereof changed by said size conversion unit, said size conversion unit expands or contracts at least one of said motion vector and said block size of said first encoded data, according to an image size ratio of a size of said image data after said size of said image data is changed to a size of said image data before said size of said image data is changed, based on said size conversion request.

3. The image conversion apparatus according to claim 1, wherein in encoding said image data having said size thereof changed by said size conversion unit, said conversion control unit approximates said prediction mode and direction, in case said prediction mode and direction of said first encoded data supplied thereto as said encoding parameters from said decoding unit are unable to be used as they are after said size of said image data is changed.

4. The image conversion apparatus according to claim 1, wherein said conversion control unit splits or synthesizes, at least one of said prediction mode and said motion vector to be re-used by said encoding unit, according to an image size ratio of a size of said image data after said size of said image data is changed to a size of said image data before said size of said image data is changed, based on said size conversion request.

5. The image conversion apparatus according to claim 1, wherein said encoding unit executes re-prediction, using at least one of said re-used prediction mode and said motion vector as a start point, based on said conversion information supplied thereto by said conversion control unit.

6. The image conversion apparatus according to claim 5, wherein said encoding unit uses a direction of said motion vector in executing said re-prediction with said re-used motion vector as said start point, based on said conversion information supplied thereto by said conversion control unit.

7. The image conversion apparatus according to claim 1, wherein said encoding unit executes re-prediction in case said prediction error is not less than a predetermined threshold value, based on said conversion information supplied thereto by said conversion control unit.

8. The image conversion apparatus according to claim 1, wherein said encoding unit comprises:
a quantizer that re-uses, in encoding said image data having said size thereof changed, by said size conversion unit, a quantization step size of said first encoded data, based on said conversion information supplied thereto by said conversion control unit.

9. The image conversion apparatus according to claim 8, wherein said quantizer re-uses, in encoding said image data having said size thereof changed by said size conversion unit, code amount distribution of said first encoded data, based on said conversion information supplied thereto by said conversion control unit.

10. The image conversion apparatus according to claim 9, wherein said conversion control unit determines whether or not at least one of said quantization step size and said code amount distribution of said input image data is to be re-used in encoding said image data having said size thereof changed.

11. The image conversion apparatus according to claim 1, wherein said encoding unit changes, in encoding said image data having said size thereof changed by said size conversion unit, bit rate of said first encoded data, based on said conversion information supplied thereto by said conversion control unit.

12. The image conversion apparatus according to claim 1, wherein said conversion control unit determines whether or not filtering is to be applied to at least one of said image data having said size thereof changed by said size conversion unit and image data being encoded by said encoding unit.

13. The image conversion apparatus according to claim 1, wherein said encoding unit re-uses, in encoding said image data having said size thereof changed by said size conversion unit, picture type information of said first encoded data, based on said conversion information supplied thereto by said conversion control unit.

14. The image conversion apparatus according to claim 1, wherein said encoding unit, in encoding said image data having said size thereof changed by said size conversion unit, converts a frame rate.

15. The image conversion apparatus according to claim 1, wherein a decoding scheme adopted in said decoding unit and an encoding scheme adopted in said encoding unit are different from each other.

16. An image conversion method comprising:
receiving, by a decoding section, first encoded data and decoding said first encoded data into image data;
performing, by a size conversion section, size conversion of said image data;
encoding, by an encoding section, said image data having a size thereof changed, by re-using prediction mode and block size information of said first encoded data for intra-frame prediction, and re-using motion vector, said block size, and reference frame information of said first encoded data for inter-frame prediction;
receiving, by a conversion control section, a size conversion request and a set of encoding parameters of said first encoded data and supplying said size conversion request to a size conversion section;
generating, by said conversion control section, conversion information including at least one of said prediction mode, said block size, said motion vector, and said reference frame information from said encoding parameters to supply said conversion information to said encoding unit; and
configuring, by said conversion control section, a prediction direction approximated to a corresponding prediction direction of said first encoded data if said corresponding prediction direction is not present in said intra-frame prediction mode of said image data having said size thereof changed.

17. A non-transitory computer readable-recording medium storing therein a program causing a computer to execute the processing comprising:
receiving first encoded data and decoding said first encoded data into image data;
performing size conversion of said image data;
encoding said image data having a size thereof changed, by re-using prediction mode and block size information of said first encoded data for intra-frame prediction, and re-using motion vector, said block size, and reference frame information of said first encoded data for inter-frame prediction; and
receiving a size conversion request and a set of encoding parameters of said first encoded data, supplying said size conversion request to a size conversion unit, and generating conversion information including at least one of said prediction mode, said block size, said motion vector, and said reference frame information from said encoding parameters to supply said conversion information to said encoding processing of said image data, and configuring a prediction direction approximated to a corresponding prediction direction of said first encoded data if said corresponding prediction direction is not present in said intra-frame prediction mode of said image data having said size thereof changed.

* * * * *